US011683765B2

(12) United States Patent
Takaoka et al.

(10) Patent No.: US 11,683,765 B2
(45) Date of Patent: *Jun. 20, 2023

(54) MOBILE STATION AND POWER ALLOCATION METHOD

(71) Applicant: Sun Patent Trust, New York, NY (US)

(72) Inventors: Shinsuke Takaoka, Osaka (JP); Hidetoshi Suzuki, Kanagawa (JP); Akihiko Nishio, Osaka (JP); Takashi Iwai, Ishikawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,803

(22) Filed: May 5, 2022

(65) Prior Publication Data

US 2022/0264485 A1   Aug. 18, 2022

Related U.S. Application Data

(63) Continuation of application No. 16/723,123, filed on Dec. 20, 2019, now Pat. No. 11,356,960, which is a
(Continued)

(30) Foreign Application Priority Data

Nov. 5, 2010   (JP) .................................. 2010-249005
Nov. 18, 2010  (JP) .................................. 2010-258360

(51) Int. Cl.
*H04W 52/30*    (2009.01)
*H04W 52/36*    (2009.01)
(Continued)

(52) U.S. Cl.
CPC ........... *H04W 52/367* (2013.01); *H04L 5/005* (2013.01); *H04W 28/0268* (2013.01);
(Continued)

(58) Field of Classification Search
CPC ... H04W 52/367; H04W 52/42; H04W 52/30; H04W 28/0268; H04W 52/346; H04W 52/146; H04W 52/34; H04L 5/005
See application file for complete search history.

(56) References Cited

U.S. PATENT DOCUMENTS 8,040,848 B2   10/2011  Uemura et al.
8,725,167 B2    5/2014  Siomina et al.
(Continued)

FOREIGN PATENT DOCUMENTS

JP    2010-41587 A    2/2010
JP    2010-171563 A   8/2010
(Continued)

OTHER PUBLICATIONS

3GPP TS 36.213 V8.8.0, "3rd Generation Partnership Project; Technical Specification Group Radio Access Network; Evolved Universal Terrestrial Radio Access (E-UTRA); Physical layer procedures (Release 8)," Sep. 2009, 77 pages.
(Continued)

*Primary Examiner* — Mounir Moutaouakil
(74) *Attorney, Agent, or Firm* — Seed IP Law Group LLP

(57) ABSTRACT

Provided are a wireless communication terminal device and a power allocation method, wherein transmission channel quality information, regarding a Pcell having a high probability that UCI is multiplied therein, can be accurately estimated by an SRS having high priority in power allocation, and an eNB can instruct appropriate transmission power to an UL channel which transmits the subsequent UCI. A power scaling detection unit detects whether or not a total transmission power value of the UL channels transmitted by the plurality of CC exceeds the maximum transmission power specific to the UE. When a plurality of SRS are simultaneously transmitted using a Pcell and a Scell, and power scaling occurs, a power scaling control unit performs
(Continued)

power allocation so that transmission power of the SRS of the Pcell has the higher priority than that of the SRS of the Scell.

10 Claims, 21 Drawing Sheets

Related U.S. Application Data continuation of application No. 16/384,505, filed on Apr. 15, 2019, now Pat. No. 10,560,906, which is a continuation of application No. 16/019,336, filed on Jun. 26, 2018, now Pat. No. 10,313,988, which is a continuation of application No. 15/860,381, filed on Jan. 2, 2018, now Pat. No. 10,051,583, which is a continuation of application No. 15/492,827, filed on Apr. 20, 2017, now Pat. No. 9,894,622, which is a continuation of application No. 13/883,100, filed as application No. PCT/JP2011/005906 on Oct. 21, 2011, now Pat. No. 9,661,588.

(51) Int. Cl.
| | | |
|---|---|---|
| *H04W 52/34* | (2009.01) | |
| *H04W 52/42* | (2009.01) | |
| *H04L 5/00* | (2006.01) | |
| *H04W 28/02* | (2009.01) | |
| *H04W 52/14* | (2009.01) | |

(52) U.S. Cl.
CPC ......... *H04W 52/30* (2013.01); *H04W 52/346* (2013.01); *H04W 52/42* (2013.01); *H04W 52/146* (2013.01); *H04W 52/34* (2013.01)

(56) References Cited

U.S. PATENT DOCUMENTS

| | | |
|---|---|---|
| 8,818,442 B2 | 8/2014 | Seo et al. |
| 8,964,868 B2 | 2/2015 | Shin et al. |
| 8,971,299 B2 | 3/2015 | Papasakellariou et al. |
| 9,042,925 B2 | 5/2015 | Seo et al. |
| 9,713,094 B2 | 7/2017 | Noh et al. |
| 9,894,622 B2 | 2/2018 | Takaoka et al. |
| 10,051,583 B2 | 8/2018 | Takaoka et al. |
| 10,091,736 B2 | 10/2018 | Noh et al. |
| 10,097,286 B2 | 10/2018 | Long et al. |
| 2010/0197339 A1 | 8/2010 | Pedersen et al. |
| 2010/0246463 A1 | 9/2010 | Papasakellariou et al. |
| 2010/0246561 A1 | 9/2010 | Shin et al. |
| 2011/0081934 A1 | 4/2011 | Imamura et al. |
| 2011/0194455 A1 | 8/2011 | Aminaka et al. |
| 2011/0199945 A1 | 8/2011 | Chang et al. |
| 2011/0275335 A1 | 11/2011 | Luo et al. |
| 2012/0040696 A1 | 2/2012 | Siomina et al. |
| 2012/0044898 A1 | 2/2012 | Ishii |
| 2012/0063398 A1 | 3/2012 | Hamaguchi et al. |
| 2012/0218904 A1 | 8/2012 | Narasimha et al. |
| 2013/0010723 A1 | 1/2013 | Ouchi et al. |
| 2013/0215811 A1 | 8/2013 | Takaoka et al. |
| 2013/0223392 A1 | 8/2013 | Seo et al. |
| 2013/0242911 A1 | 9/2013 | Heo et al. |
| 2013/0272257 A1 | 10/2013 | Takaoka et al. |
| 2014/0219153 A1 | 8/2014 | Seo et al. |
| 2017/0353931 A1 | 12/2017 | Stern-Berkowitz et al. |

FOREIGN PATENT DOCUMENTS

| | | |
|---|---|---|
| JP | 2011-166571 A | 8/2011 |
| WO | 2010/087622 A2 | 8/2010 |
| WO | 2010/103862 A1 | 9/2010 |
| WO | 2010/125969 A1 | 11/2010 |

OTHER PUBLICATIONS

Alcatel-Lucent, Alcatel-Lucent Shanghai Bell, "Clarification on power scaling," R1-104079, Agenda Item: 6.2.5, 3GPP TSG-RAN WG1 #61bis, Dresden, Germany, Jun. 28-Jul. 2, 2010, 3 pages.
Alcatel-Lucent, Alcatel-Lucent Shanghai Bell, "Clarification on power scaling," R1-104387, Agenda Item: 6.2.3, 3GPP TSG-RAN WG1 #62, Madrid, Spain, Aug. 23-27, 2010, 3 pages.
Alcatel-Lucent, Alcatel-Lucent Shanghai Bell, "Clarification on power scaling," R1-105197, Agenda Item: 6.2.2, 3GPP TSG-RAN WG1 #62bis, Xi'an, China, Oct. 11-15, 2010, 3 pages.
CATT, "Sounding reference signals in UpPTS for FS2," R1-080172, 3GPP TSG RAN WG1 meeting #51bis, Agenda Item: 6.1.7, Sevilla, Spain, Jan. 14-18, 2008, 2 pages.
CATR, "Discussion of power Scaling Method for UL PC," R1-104719, Agenda Item: 6.2.3, 3GPP TSG-RAN WG1 #62, Madrid, Spain, Aug. 23-27, 2010, 4 pages.
CATR, "Discussion of power Scaling Method for UL PC," R1-105641, Agenda Item: 6.2.2, 3GPP TSG-RAN WG1 #62bis, Xi'an, China, Oct. 11-15, 2010, 4 pages.
International Search Report, dated Jan. 24, 2012, for International Application No. PCT/JP2011/005906, 4 pages.
Nokia Siemens Networks, Nokia Corporation, "Remaining issues on uplink power control," R1-103792, Agenda item: 6.2.5, 3GPP TSG RAN WG1 #61bis Meeting, Dresden, Germany, Jun. 28-Jul. 2, 2010, 6 pages.
Nokia Siemens Networks, Nokia Corporation, "Remaining issues on uplink power control," R1-104438, Agenda item: 6.2.3, 3GPP TSG RAN WG1 #62 Meeting, Madrid, Spain, Aug. 23-27, 2010, 5 pages.
Research In Motion, UK Limited, "Power control for SRS transmission in CA," R1-105508, 3GPP TSG RAN WG1 Meeting #62bis, Agenda Item: 6.2.2, Xi'an, China, Oct. 11-15, 2010, 1 page.
Samsung, "Discussion on multiplexing SRS and PUSCH in an SC-FDMA symbol in carrier-aggregated system," R1-105376, 3GPP TSG RAN WG1 #62bis, Xi'an, China, Oct. 11-15, 2010, 1 page.

MOBILE STATION AND POWER ALLOCATION METHOD

TECHNICAL FIELD

The present invention relates to a radio communication terminal apparatus and a power allocation method.

BACKGROUND ART

In 3rd Generation Partnership Project (3GPP), studies have been carried out on LTE-Advanced (hereinafter, abbreviated as "LTE-A"). In LTE-A, the introduction of a bandwidth expansion technology called "carrier aggregation (CA)" has been studied. In LTE-A carrier aggregation, an approach is taken in downlink (DL) and uplink (UL) channels that achieves high speed transmission by aggregating a plurality of carriers, i.e., by bundling component carriers (CCs) each having 20 MHz, for example. In LTE-A, studies have been carried out on bandwidth expansion through the introduction of five CCs, i.e., up to 100 MHz, as a possible range.

In this respect, studies have been carried out at the same time on a transmission power control method targeting UL CA. In the studies on UL transmission power control in LTE-A, the following matters (A) to (C) have been agreed. CC-specific transmission power control is performed (A). CC-specific (for each UL channel) maximum transmission power Pcmax, c, and UE (User Equipment) specific (UE-specific) maximum transmission power Pcmax (upper limit of total maximum transmission power on a plurality of CCs) are provided (B). In addition, when the transmission power of each UL channel transmitted on one CC exceeds the CC-specific (for each UL channel) maximum transmission power, or when the total value of transmission power of UL channels transmitted on a plurality (all) of CCs in simultaneous transmission of a plurality of UL channels exceeds a UE-specific maximum transmission power, control called power scaling, which reduces the transmission power of a UL channel, is performed (B). In UL CA, the power allocation priority rule for a plurality of UL channels when power scaling occurs in simultaneous transmission of a plurality of UL channels is agreed as follows (C).

PUCCH>PUSCH with UCI>PUSCH without UCI

PUCCH stands for Physical Uplink Control CHannel, and PUSCH stands for Physical Uplink Shared CHannel. UCI is an abbreviation for Uplink Control Information, and for example, includes the following control information, specifically. UCI includes acknowledgment/non acknowledgment (ACK/NACK), rank indicator (RI), channel quality information (CQI), pre-coding matrix indicator (PMI) and channel state information (CSI). A periodic or aperiodic transmission method is used for transmitting the information such as CSI and CQI, for example.

In addition, the term "PUSCH with UCI" refers to a PUSCH on which UCI is multiplexed, and the term "PUSCH without UCI" refers to a PUSCH on which no UCI is multiplexed. Accordingly, when power scaling occurs in simultaneous transmission of a plurality of UL channels, the transmission power is allocated in the following order: the transmission power for PUCCH; the transmission power for PUSCH on which UCI is multiplexed; and the transmission power for PUSCH on which no UCI is multiplexed. This rule applies regardless of whether these channels are on the same CC or on different CCs.

Meanwhile, studies have been carried out on a power allocation rule used when power scaling relating to a periodic sounding reference symbol (SRS) or an aperiodic SRS used for measuring a channel quality such as CQI occurs. The power allocation rule can be classified into the following three cases (A) to (C), for example.

(A) Priority between a (periodic/aperiodic) SRS and a different UL channel (such as PUCCH or PUSCH) is as follows. Specifically, Non-Patent Literature (hereinafter, abbreviated as "NPL") 1 describes the following priority used when power scaling occurs.

PUCCH>SRS>PUSCH

Accordingly, when power scaling occurs, the transmission power for a terminal is preferentially allocated in the order of a PUCCH, an SRS, and a PUSCH.

(B) Priority between a periodic SRS and an aperiodic SRS is as follows. Specifically, NPL 2 describes the following priority used when power scaling occurs.

Aperiodic SRS>Periodic SRS

Accordingly, when power scaling occurs in simultaneous transmission of a periodic SRS and an aperiodic SRS, the transmission power is preferentially allocated in the order of an aperiodic SRS, and a periodic SRS.

(C) Priority between a plurality (periodic or aperiodic) of SRSes is as follows.

NPL 1 describes a power allocation priority rule used when a plurality of periodic SRSes are simultaneously transmitted on a plurality of CCs. Specifically, NPL 1 discloses a method of determining priority for transmission power for periodic SRSes in accordance with UL CC ID numbers as illustrated in FIG. 1. FIG. 1 is a conceptual diagram for allocating larger transmission power in descending order of ID numbers of UL CCs when power scaling occurs in simultaneous transmission of periodic SRSes on three CCs. Accordingly, each terminal can appropriately determine the transmission power of a periodic SRS for each of the CCs in accordance with this rule even when power scaling occurs in simultaneous transmission of periodic SRSes on a plurality of CCs.

CITATION LIST

Non-Patent Literatures

NPL 1
R1-105376, Discussion on multiplexing SRS and PUSCH in an SC-FDMA symbol in carrier-aggregated system, 3GPP TSG RAN WG1 #62bs, Xi'an, China, Oct. 11-15, 2010
NPL 2
R1-105508, Power control for SRS transmission in CA, 3GPP TSG RAN WG1 #62bs, Xi'an, China, Oct. 11-15, 2010
NPL 3
3GPP TS 36.213 V8.8.0 (2009 September)

SUMMARY OF INVENTION

Technical Problem

The technique disclosed in NPL 1 has the following problems, however. Specifically, the technique does not take into account the effects of the method of selecting a CC for multiplexing important UCI to which no retransmission is applied, on the power allocation priority used when power scaling occurs in simultaneous transmission of a plurality of periodic SRSes on a plurality of CCs. Since UCI needs to be reported to an eNB from a terminal with low delay, only single transmission is supported for UCI.

Accordingly, when a CC configured with lower power allocation priority based on the technique disclosed in NPL 1 (CC that is likely to have a larger CQI measurement error in the eNB) is used as a CC on which UCI is to be multiplexed, the measurement error of communication quality (e.g., Signal-to-Interference plus Noise power Ratio (SINR)) on the CC, which is derived using an SRS subjected to power scaling (transmission power is reduced), is large. Accordingly, the eNB cannot report an appropriate transmission power (or Modulation and channel Coding Scheme (MCS)) value for the UCI to be transmitted in a subsequent subframe. It should be noted that, power scaling occurs according to transmission power control information related to a UE-specific power amplifier (PA) that an eNB cannot know, e.g., a parameter (such as Maximum Power Reduction (MPR)) for determining the maximum transmission power for each UE or each CC of a UE, the eNB does not know whether power scaling has occurred, basically.

When a UE performs power scaling (reduction of transmission power) for an SRS on a certain CC of a smaller UL CC ID number based on the technique disclosed in NPL 1 because the transmission power exceeds the UE-specific maximum transmission power in simultaneous transmission of a plurality of SRSes on a plurality of CCs, for example, the eNB measures the communication quality of the CC using a received SRS with a reduced reception level. As described above, since the eNB, however, has no information indicating when power scaling has occurred for the terminal, basically, the eNB erroneously recognizes the reason for reduction in the SRS reception level as being deterioration in the quality of the mobile communication channel, which easily changes with time, instead of the occurrence of power scaling in the terminal. In addition, the eNB reports an instruction to use a large transmission power value (small MCS value) not less than a value required to satisfy predetermined reception quality for transmission of a subsequent UL channel (on which UCI is multiplexed) such as a PUSCH. Stated differently, transmission of a UL channel with excessive quality is performed for a subsequent UL channel such as a PUSCH in this case (co-channel interference to another cell is increased when an instruction to increase the transmission power is transmitted. In addition, another problem such as an unnecessary increase in the power consumption of the terminal is caused).

It is an object of the present invention to provide a radio communication terminal apparatus and a power allocation method each of which enables highly accurate estimation of propagation channel quality information on a Pcell that is likely to be multiplexed with UCI, using an SRS with high power allocation priority, and which also enables an eNB to indicate appropriate transmission power for a subsequent UL channel for transmitting UCI.

Solution to Problem

A radio communication terminal apparatus according to an aspect of the present invention, includes: a transmission power calculating section that calculates transmission power of a plurality of uplink channels on a plurality of component carriers of carrier aggregation; a power scaling detecting section that detects, using the calculated transmission power, whether or not a total value of the transmission power of the uplink channels transmitted on the plurality of component carriers exceeds maximum transmission power specific to the apparatus and whether or not power scaling occurs as a result; and a power scaling controlling section that preferentially allocates, when power scaling detecting section detects that power scaling occurs and when a plurality of reference signals is transmitted using a primary cell and a secondary cell, transmission power with respect to a reference signal of the primary cell over a reference signal of the secondary cell.

A power allocation method according to an aspect of the present invention, includes: a transmission power calculating step of calculating transmission power of a plurality of uplink channels on a plurality of component carriers of carrier aggregation; a power scaling detecting step of detecting, using the calculated transmission power, whether or not a total value of the transmission power of the uplink channels transmitted on the plurality of component carriers exceeds maximum transmission power specific to a corresponding apparatus and whether or not power scaling occurs as a result; and a power scaling controlling step of preferentially allocating, when power scaling detecting section detects that power scaling occurs and when a plurality of reference signals is transmitted using a primary cell and a secondary cell, transmission power with respect to a reference signal of the primary cell over a reference signal of the secondary cell.

Advantageous Effects of Invention

According to the present invention, propagation channel quality information on a Pcell that is likely to be multiplexed with UCI can be estimated with high accuracy using an SRS with high power allocation priority, and also, an eNB can indicate appropriate transmission power for a subsequent UL channel for transmitting UCI.

DESCRIPTION OF EMBODIMENTS

The inventors of the present invention have made the invention with careful observation of the following points. Specifically, when a PUSCH is scheduled with a primary cell (Pcell) or primary component carrier (PCC) (i.e., to be transmitted with transmission assignment (UL grant)) in LTE-A, UCI is multiplexed with the PUSCH on a Pcell (PCC) as a method for selecting a CC (PUSCH) for multiplexing UCI. In addition, the CC used for transmitting a PUCCH (i.e., for multiplexing only UCI) is limited to only a Pcell (PCC). Accordingly, as compared with a secondary cell (Scell) or secondary component carrier (SCC), it is likely that UCI with high priority to which no retransmission is applied is transmitted using a Pcell (PCC).

In addition, when there is not much traffic during system operation, only a Pcell is preferentially used in general (Pcell is selected as a cell that allows easier communication over a long period of time), which improves the spectral efficiency of the system bandwidth (between overall CCs). Moreover, PUCCH transmission is backward compatible with LTE Release 8 when a Pcell is used, so that efficient transmission is made possible on the PUCCH on which only UCI is transmitted (incidentally, LTE-A is planned to be released with Release 10).

In addition, an eNB configures a UE with a UE-specific Pcell (PCC) and Scell (SCC) and notifies the UE of the UE-specific Pcell and Scell (e.g., via higher layer signaling with extremely low transmission error rate), so that both of the eNB and each UE can recognize the Pcell (PCC) and Scell (SCC) configuration in advance.

Hereinafter, embodiments of the present invention will be described in detail with reference to the accompanying drawings.

Embodiment 1

Figure 1:
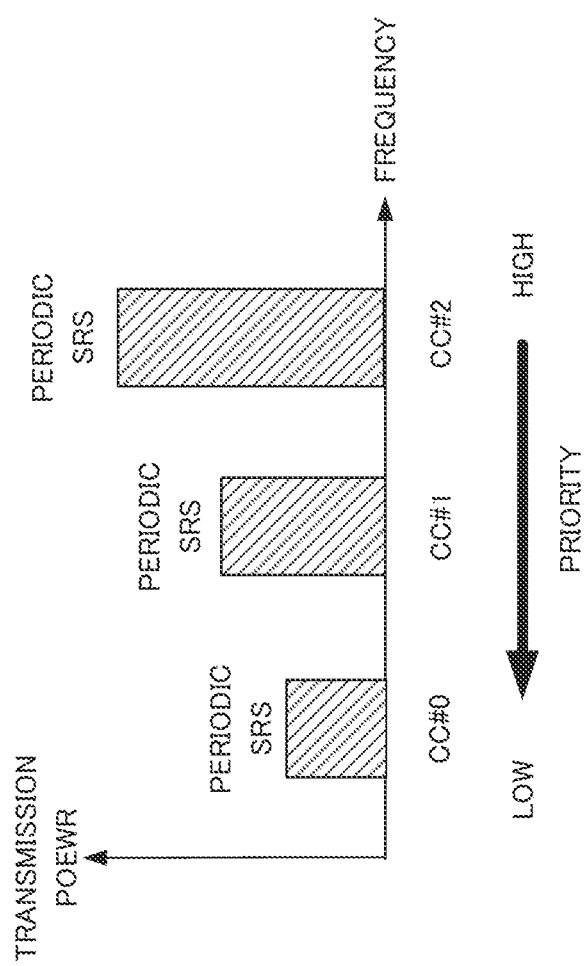
FIG. 1 is a diagram illustrating a method of determining priority of transmission power disclosed in NPL 1.
Figure 2:
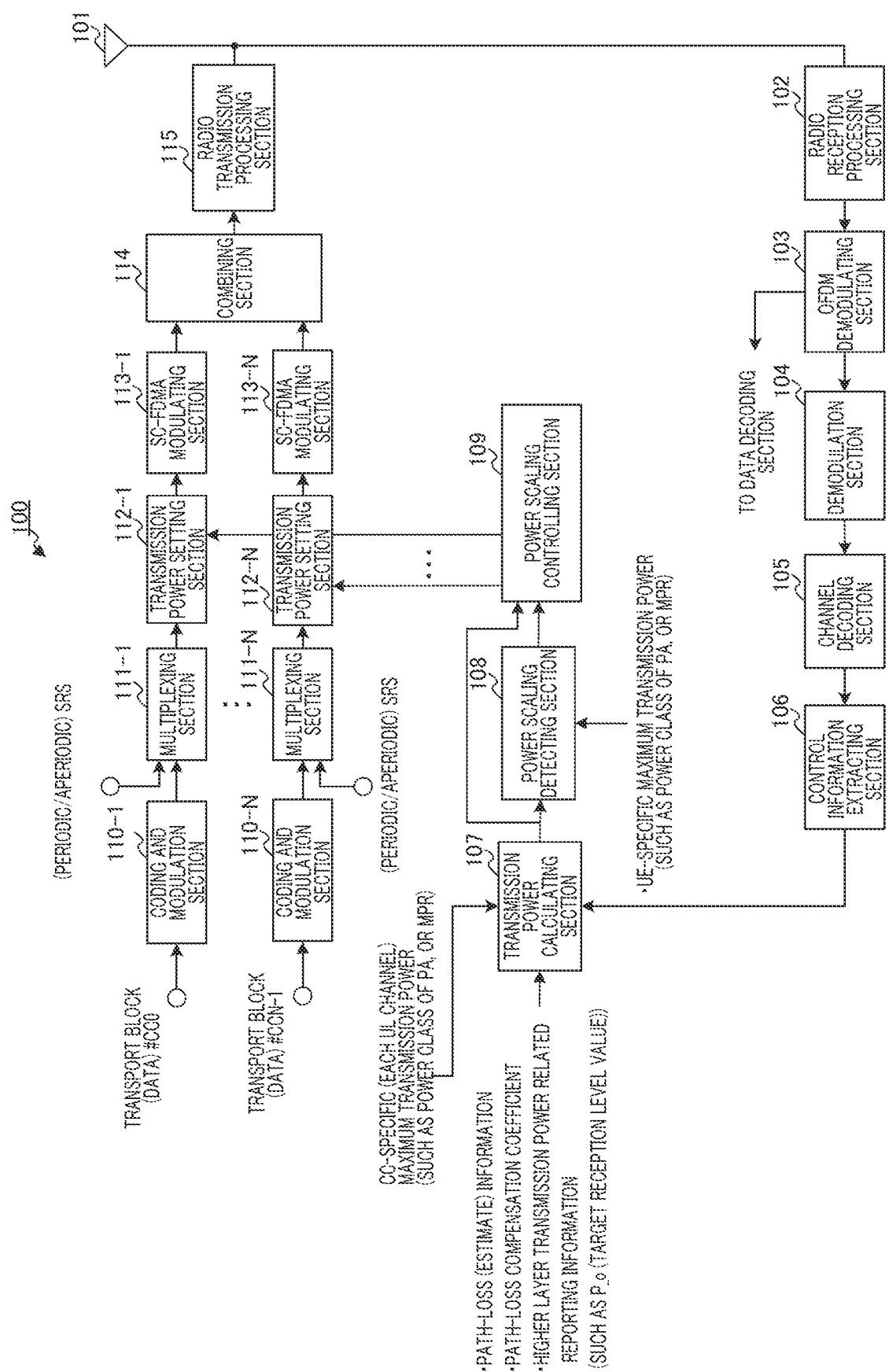
FIG. 2 is a block diagram illustrating a configuration of a radio communication terminal apparatus according to Embodiments 1 and 2 of the present invention.

FIG. 2 is a block diagram illustrating a configuration of radio communication terminal apparatus (hereinafter, referred to as "terminal") 100 according to Embodiment 1 of the present invention. Hereinafter, the configuration of terminal 100 will be described using FIG. 2.

Radio reception processing section 102 receives, via antenna 101, an OFDM signal transmitted from a base station (eNB), performs predetermined RF processing such as down-conversion, A/D conversion and/or the like on the received OFDM signal and outputs the processed signal to OFDM demodulation section 103.

OFDM demodulation section 103 removes a guard interval (GI) from the OFDM signal outputted from radio reception processing section 102 and performs a discrete Fourier transform (DFT) on the OFDM signal from which the GI has been removed, to transform the signal into a frequency-domain signal. Next, OFDM demodulation section 103 performs frequency-domain equalization (FDE) and/or the like on the components of the frequency domain to remove signal distortion, and outputs the processed signal to demodulation section 104.

Demodulation section 104 performs predetermined demodulation processing for a modulation scheme such as QPSK or 16QAM (Quadrature Amplitude Modulation) on the signal outputted from OFDM demodulation section 103 and outputs the processed signal to channel decoding section 105.

Channel decoding section 105 performs decoding processing (iterative MAP decoding or Viterbi decoding) for error correction coding such as turbo coding and convolutional coding on the signal outputted from demodulation section 104.

Control information extraction section 106 extracts control information from the signal outputted from channel decoding section 105 and outputs the extracted control information to transmission power calculating section 107. The control information to be extracted herein includes: UL grant information (allocation bandwidth, MCS set, PUSCH, SRS or PUCCH transmission power information (TPC command, transmission format dependent value $\Delta_{TF}$ such as MCS, and SRS offset value $P_{SRS\_offset}$), and aperiodic SRS trigger information, for example), DL grant information (transmission power information on PUCCH or the like, and aperiodic SRS trigger information, for example), UCI request (trigger) information, CC/cell information such as Pcell/Scell and PCC/SCC.

Transmission power calculating section 107 calculates transmission power of a plurality of UL channels (on each CC) using the control information outputted from control information extraction section 106, CC-specific (each UL channel) maximum transmission power (such as power class of power amplifier (PA) and MPR), path-loss (estimate) information, transmission power related reporting information on a higher layer (path-loss compensation coefficient, P_o (target reception level value) and/or the like), for example. As a specific calculation method, PUSCH, PUCCH and SRS transmission power calculation formulae described in NPL 3 are used, for example. Transmission power calculating section 107 outputs transmission power values of a plurality of UL channels (on each CC) to power scaling detecting section 108 and power scaling controlling section 109.

Power scaling detecting section 108 calculates total transmission power of a plurality of CCs (all UL channels) from the transmission power values of a plurality of UL channels outputted from transmission power calculating section 107 and compares the calculated total transmission power with UE-specific maximum transmission power (Pcmax) to be received.

When the total transmission power is smaller than the UE-specific maximum transmission power, control information indicating "power scaling is unnecessary" is outputted to power scaling controlling section 109. On the other hand, when the total transmission power is larger than the UE-specific maximum transmission power, control information indicating "power scaling is necessary" is outputted to power scaling controlling section 109.

In accordance with information indicating the presence or absence of occurrence of power scaling outputted from power scaling detecting section 108, power scaling controlling section 109 performs transmission power scaling on each UL channel (such as SRS, PUSCH and PUCCH) when the control information indicates "power scaling is necessary," to determine the transmission power for each of the plurality of UL channels (CCs). The transmission power information after power scaling is outputted to transmission power setting sections 112-1 to 112-N. The details of an SRS power scaling method will be described hereinafter.

Coding and modulation sections 110-1 to 110-N perform error correction coding such as turbo coding and predetermined modulation processing such as QPSK or 16QAM on a transport block (TB) for each CC to be received, and output the resultant signal to multiplexing sections 111-1 to 111-N.

Figure 3:
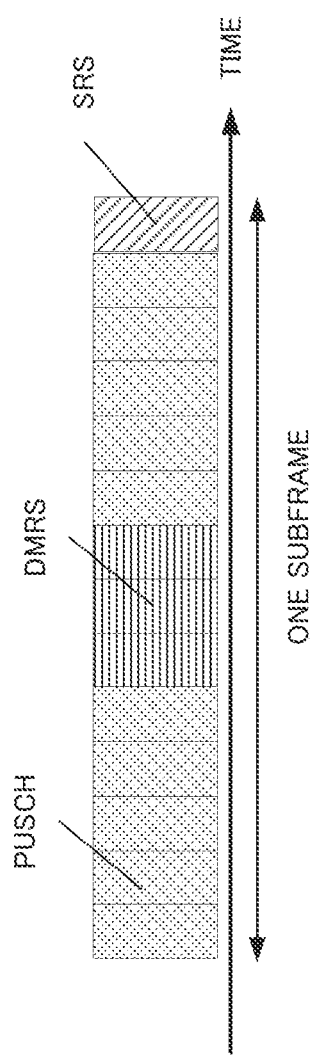
FIG. 3 is a diagram illustrating a configuration in which an SRS is multiplexed at the end portion of a subframe.

Multiplexing sections 111-1 to 111-N multiplex a periodic SRS (when triggered by higher layer control information) or aperiodic SRS (when triggered by a PDCCH of the physical layer control channel) to be received, with a modulation symbol sequence and outputs the resultant signal to transmission power setting sections 112-1 to 112-N. In LTE (LTE-A), an SRS is multiplexed only at the last symbol of one subframe consisting of 14 SC-FDMA symbols as illustrated in FIG. 3 (when SRS is time-multiplexed with PUSCH). Thus, in order to allow such time-domain multiplexing, an SRS is multiplexed at the last symbol of the modulation symbols. FIG. 3 illustrates a state where a demodulation reference signal occupies roughly three symbols (DMRS) on a center portion of a subframe.

Transmission power setting sections 112-1 to 112-N set the transmission power for each UL channel (such as SRS, PUSCH and PUCCH) using the transmission power information on each of the plurality of UL channels (CCs) outputted from power scaling controlling section 109 and output the transmission power to SC-FDMA modulation section 113-1 to 113-N.

SC-FDMA modulation section 113-1 to 113-N perform precoding by applying a DFT on the symbol sequences on which the transmission power is set and which are outputted from transmission power setting sections 112-1 to 112-N. After the signals subjected to DFT precoding are mapped to predetermined frequency resources indicated by the eNB, the processed signals are transformed into time-domain signals by IDFT. Lastly, the processed signals after addition of a guard interval are outputted to combining section 114.

Combining section 114 combines the plurality of SC-FDMA signals outputted from SC-FDMA modulation sections 113-1 to 113-N and outputs the combined signal to radio transmission processing section 115.

Radio transmission processing section 115 performs predetermined RF processing such as D/A conversion, amplification processing, and up-conversion on the signal outputted from combining section 114 and transmits the processed signal to antenna 101.

Next, power scaling methods 1 to 12 for SRSes in simultaneous transmission of a plurality of SRSes will be described.

Power Scaling Method 1

In power scaling method 1, transmission power calculating section 107 calculates transmission power of a plurality of UL channels of a plurality of CCs, first.

Next, power scaling detecting section 108 detects whether or not the total value of transmission power of the UL channels transmitted on the plurality of CCs exceeds the UE-specific maximum transmission power (whether or not power scaling occurs).

Next, when power scaling occurs in simultaneous transmission of a plurality of (periodic or aperiodic) SRSes using a Pcell (PCC) and Scell (SCC), power scaling controlling section 109 preferentially allocates transmission power with respect to an SRS of a Pcell over an SRS of an Scell of the plurality of (periodic or aperiodic) SRSes to be transmitted simultaneously.

Figure 4:
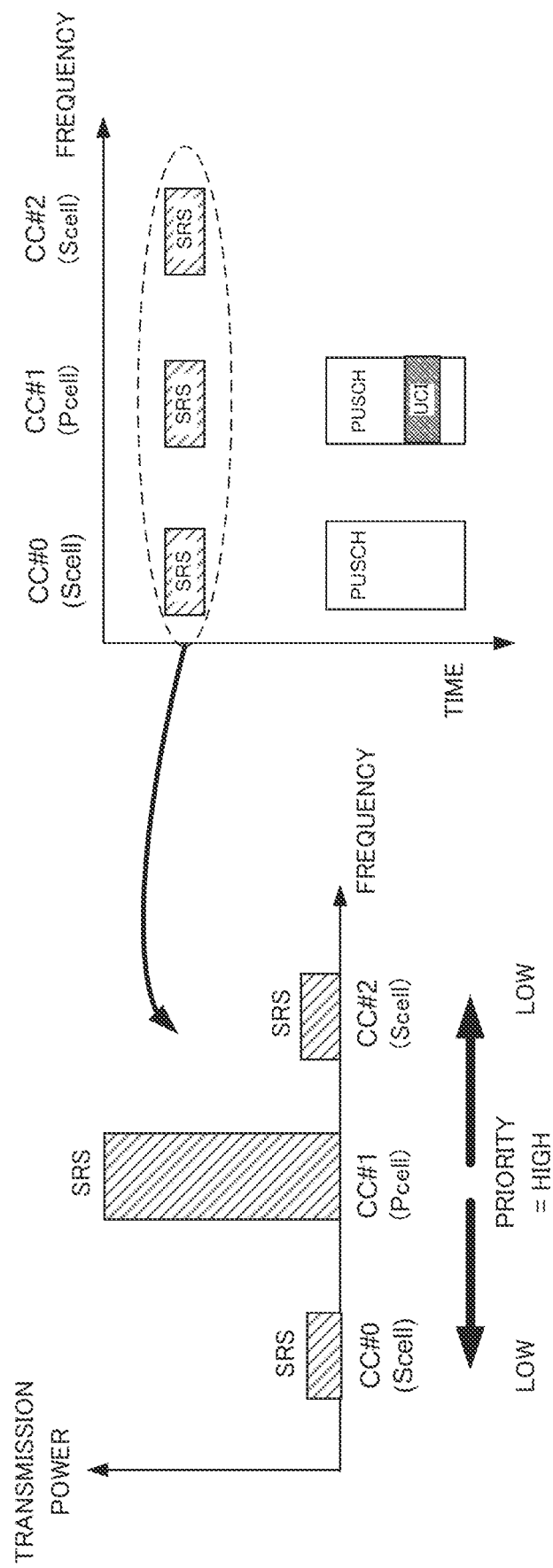
FIG. 4 is a diagram illustrating an overview of power scaling method 1.

FIG. 4 illustrates an overview of power scaling method 1. In FIG. 4, the SRSes are simultaneously transmitted on three CCs (CC #0 to CC #2). For example, only SRSes are transmitted on the three CCs using the last symbol position of one subframe (see, FIG. 3). According to the control signal reported from the base station (via higher layer signaling), CC #0, CC #1, and CC #2 are configured as an Scell, Pcell, and Scell, respectively. FIG. 4 illustrates the operation to preferentially allocate transmission power with respect to the SRS on CC #1 configured as a Pcell over the SRSes on CC #0 and CC #2 each configured as an Scell, when the total value of transmission power of the SRS channels on the three CCs transmitted as a plurality of CCs exceeds the UE-specific maximum transmission power in this situation.

Accordingly, it is possible to reduce the probability of a CC that transmits an SRS with low power allocation priority (i.e., CC that is likely to have a larger CQI measurement error) being identical to a CC on which UCI is to be multiplexed. For example, the probability of the Scells of CC #0 and CC #2 with low power allocation priority being identical to a CC on which UCI is to be multiplexed can be reduced as illustrated in FIG. 4. Thus, the propagation channel quality information (Channel Quality Indicator (CQI)) on the Pcell on which UCI is likely to be multiplexed can be estimated with high accuracy by the SRS with high power allocation priority. Accordingly, the eNB can indicate appropriate transmission power (MCS) for a subsequent UL channel transmitting UCI (e.g., PUSCH on which data and UCI are multiplexed, PUCCH on which UCI is multiplexed, and/or the like). Stated differently, it is possible to transmit UCI without setting excessive quality for the transmission format used for the UL channel transmitting the UCI. In addition, transmission can be performed without any unnecessary increase of the co-channel interference to another cell or in power consumption of the terminal.

Power Scaling Method 2

In power scaling method 2, power scaling controlling section 109 performs power scaling by setting the transmission power of the SRS of a Pcell to be not greater than the CC-specific (for each UL channel) maximum transmission power (while satisfying the CC-specific maximum transmission power condition), then keeping (not changing) the transmission power of the SRS of the Pcell, and reducing the transmission power of an Scell.

Figure 5:
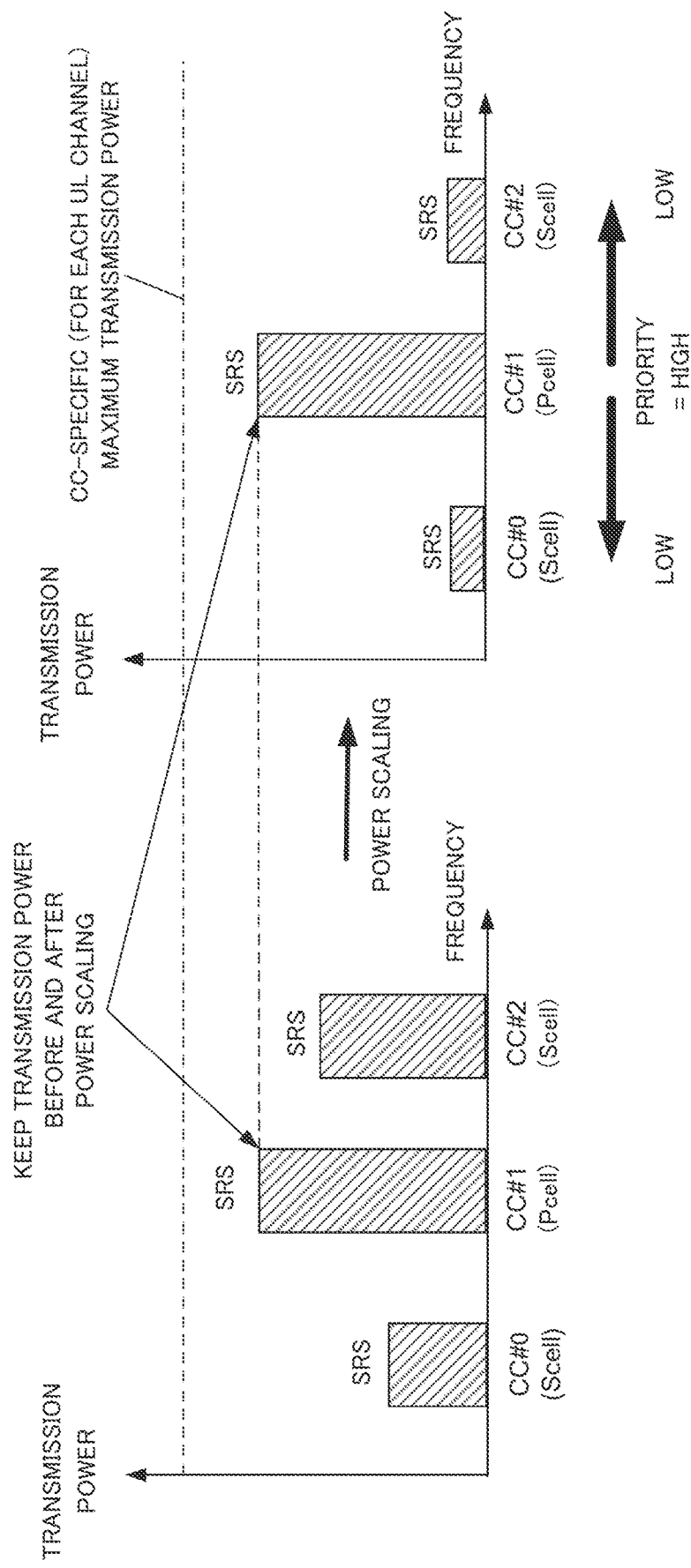
FIG. 5 is a diagram illustrating an overview of power scaling method 2.

FIG. 5 illustrates an overview of power scaling method 2. In FIG. 5, the SRSes are simultaneously transmitted on three CCs (CC #0 to CC #2). According to the control signal reported from the base station (via higher layer signaling), CC #0, CC #1, and CC #2 are configured as an Scell, Pcell, and Scell, respectively. FIG. 5 illustrates the operation to perform power scaling by keeping (not changing) the transmission power of the SRS on CC #1 configured as a Pcell, and reducing the transmission power of the SRSes on CC #1 and CC #2 each configured as an Scell, when the total value of transmission power of SRS channels on the three CCs transmitted as a plurality of CCs exceeds the UE-specific maximum transmission power in this situation.

Accordingly, setting the transmission power of the SRS of a Pcell in such a way that the condition that the transmission power of the SRS of a Pcell is equal to or less than the maximum transmission power of each CC (each UL channel) makes it possible to maintain co-channel interference to another cell from each CC to be equal to or less than a certain predetermined value and also makes scheduling for each CC and cross-carrier scheduling performed by each eNB easier. In addition, surely keeping (not allowing any change) the transmission power level of the SRS of a Pcell allows the propagation channel quality of the Pcell by a (periodic or aperiodic) SRS to be measured with even higher accuracy than that in the case of power scaling method 1.

In other words, it is possible to prevent the communication quality information on a Pcell that is obtained from the received SRS of the Pcell from being affected by power scaling in the terminal (to avoid misrecognition of the UE transmission power between the UE and eNB). Thus, the eNB can perform more appropriate operation in subsequent scheduling (resource allocation) and transmission power (Adaptive Modulation channel Coding (AMC)) control for the Pcell on which UCI is likely to be transmitted. Accordingly, it is possible to obtain the effect of eliminating the need for passive control such as setting a large margin for transmission power (AMC) control.

Power Scaling Method 3

In power scaling method 3, power scaling controlling section 109 performs power scaling by keeping (not changing) the transmission power of the SRS of a Pcell, and dropping the SRS of an Scell (this means that no SRS is transmitted or transmission power is set equal to zero (transmission power=0)).

Figure 6:
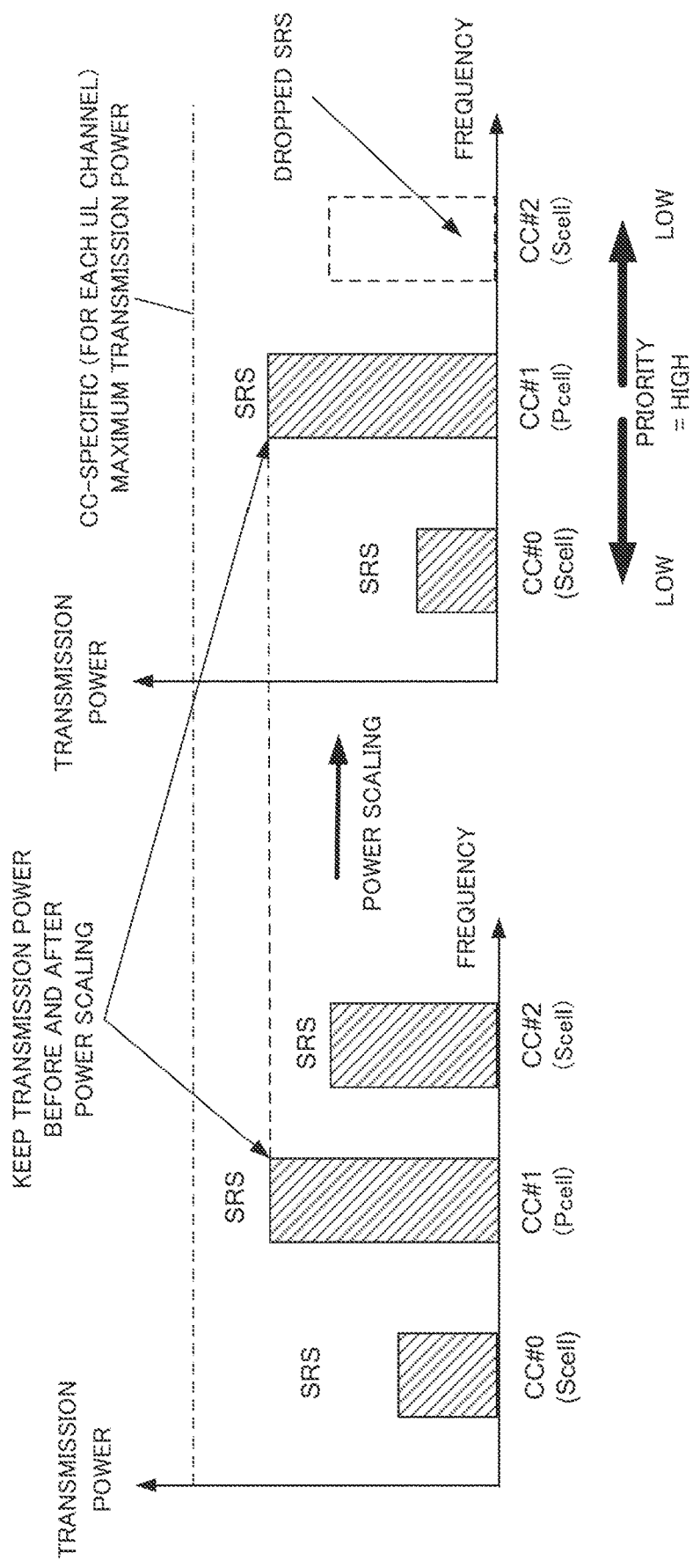
FIG. 6 is a diagram illustrating an overview of power scaling method 3.

FIG. 6 illustrates an overview of power scaling method 3. As in FIGS. 4 and 5, the SRSes are simultaneously transmitted on three CCs (CC #0 to CC #2) in FIG. 6. According to the control signal reported from the base station (via higher layer signaling), CC #0, CC #1, and CC #2 are configured as an Scell, Pcell, and Scell, respectively. FIG. 6 illustrates the operation to perform power scaling by keeping (i.e., not changing) the transmission power of the SRS on CC #1 configured as a Pcell, and dropping the SRS on CC #2 configured as an Scell, when the total value of transmission power of SRS channels of the three CCs transmitted as a plurality of CCs exceeds the UE-specific maximum transmission power in this situation.

Accordingly, dropping the SRS of an Scell enables simplification of complex power allocation control between CCs in addition to obtaining the effects brought about by power scaling method 1. In LTE-A, an SRS is multiplexed only at the last symbol of one subframe consisting of 14 symbols. Accordingly, even when the last symbol alone is dropped, the influence on the spectrum efficiency is small. For example, when an SRS is transmitted only on one CC, the impact of dropping the symbol is equal to 7% (1/14=7%). Moreover, the frequency (cycle) of SRS transmission is, for example, once in 10 ms for periodic SRS, which is very low as compared with the frequency of data transmission. Thus, the influence on the spectrum efficiency is even smaller (data can be transmitted once in 1 ms at minimum).

In addition, dropping the SRS enables easier detection of the occurrence of power scaling in a terminal during blind detection processing on SRS reception power in an eNB. This is because, setting the transmission power of the SRS of an Scell (SCC) to be equal to zero (no SRS transmission) when power scaling occurs in simultaneous transmission of a plurality of SRSes allows an eNB to easily determine that power scaling has occurred when the eNB can only measure a received SRS level as low as a noise level during an SRS reception period, for example. Accordingly, it is possible to avoid transmitting a wrong instruction on transmission power (MCS) to a terminal for a subsequent subframe (e.g., transmitting an instruction resulting in excessive quality).

For example, when detecting a significant decrease in the SRS reception level (value as low as a noise level), the eNB can instruct the terminal to retransmit (trigger) an SRS with an appropriate transmission power value for the SRS again.

Figure 7:
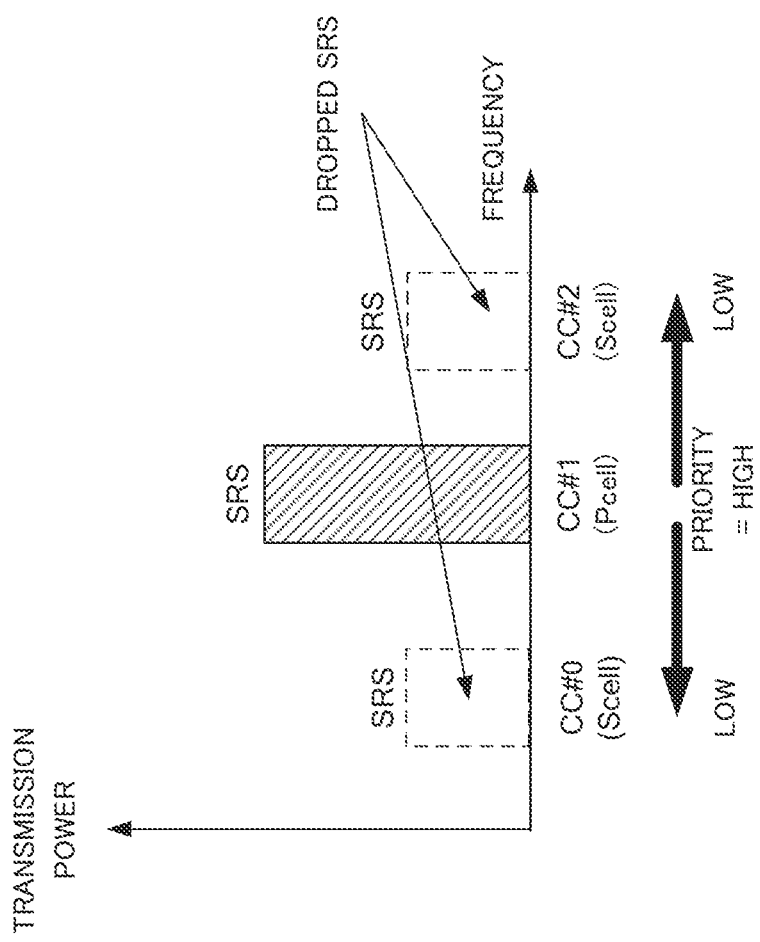
FIG. 7 is a diagram illustrating how two SRSes are dropped.

Although Embodiment 1 is described with a case where power scaling method 3 is applied when power scaling occurs in simultaneous transmission of a plurality of SRSes on a plurality of CCs, it is possible to drop the SRS of an Scell in simultaneous transmission of SRSes of a Pcell and Scell even when no power scaling occurs. Moreover, it is also possible to uniformly drop all the SRSes on a plurality of Scells. FIG. 7 illustrates a case where two SRSes respectively on CC #0 and CC #2 are dropped in simultaneous transmission of SRSes on CC #0 to CC #2. Thus, it is possible to omit the arithmetic operation required for power allocation processing between CCs while obtaining the same effects as those described above, and also to significantly reduce the man hours for testing terminals (or eNBs) with respect to power scaling, which is indispensable for the commercialization of LTE-A.

In addition, when a periodic SRS and aperiodic SRS are transmitted using Scells, a periodic SRS may be preferentially dropped over an aperiodic SRS. Furthermore, this method can be applied to the case where power scaling occurs in simultaneous transmission of a plurality of SRSes on a plurality of CCs (A) or the case where no power scaling occurs in simultaneous transmission of a plurality of SRSes of a Pcell and Scell (B).

An aperiodic SRS is the SRS that is newly introduced into LTE-A and configured to be triggered by a PDCCH, which is a physical layer downlink control channel, for an eNB to measure new quality information with low delay. Meanwhile, a periodic SRS (of transmission cycle, trigger, timer and/or the like) is configured by higher layer signaling, so that only low speed control is possible. Accordingly, the feature of an aperiodic SRS (for eNB to make immediate determination on CQI measurement using SRS) can be reflected in power scaling processing, and the same effects as those described above can be obtained. In addition, the effect of reducing the man hours for testing terminals (or eNBs) with respect to power scaling can be obtained in the case described above (B).

Figure 8:
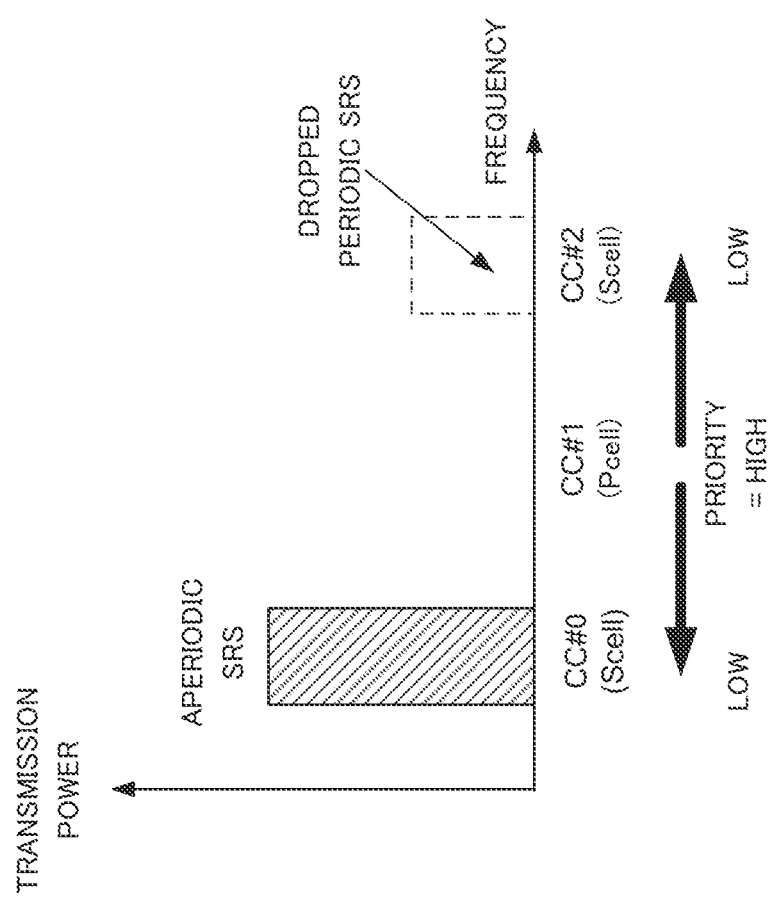
FIG. 8 is a diagram illustrating how a periodic SRS is dropped.

FIG. 8 illustrates how the periodic SRS of the Scell of CC #2 is dropped when the aperiodic SRS is triggered on the Scell of CC #0 and the periodic SRS is triggered on the Scell of CC #2 while nothing is transmitted on the Pcell of CC #1 at the same symbol position of the same subframe (e.g., the last symbol position of a subframe).

Power Scaling Method 4

In power scaling method 4, when a plurality of SRSes of Scells is present, power scaling controlling section 109 reduces (drop or setting the transmission power to be equal to zero (no SRS transmission)) the transmission power in ascending order of the transmission power of SRSes of the Scells (or the smallest) (while keeping the transmission power of the SRS of the Pcell).

Figure 9:
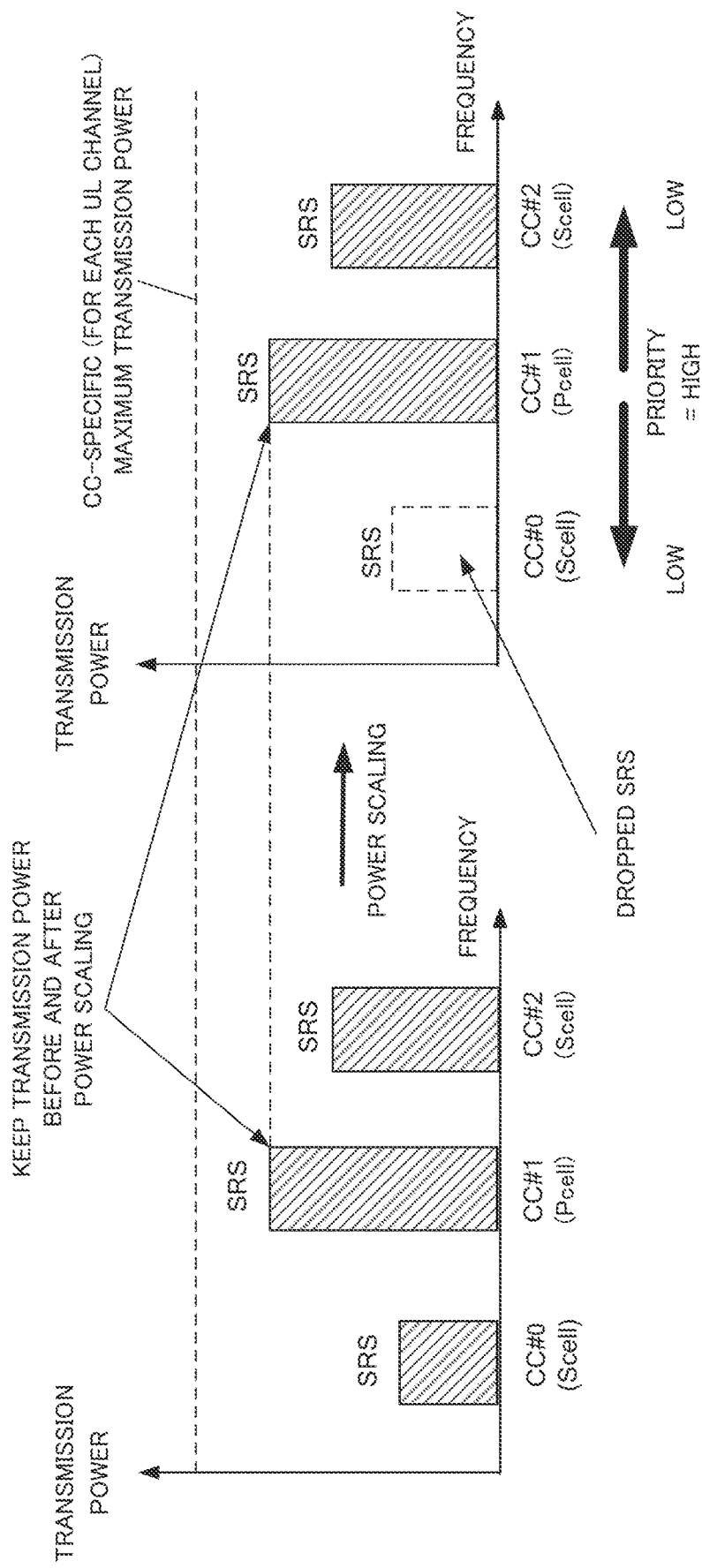
FIG. 9 is a diagram illustrating an overview of power scaling method 4.

FIG. 9 illustrates an overview of power scaling method 4. As in FIGS. 4 and 5, the SRSes are simultaneously transmitted on the three CCs (CC #0 to CC #2) in FIG. 9. According to the control signal reported from the base station (via higher layer signaling), CC #0, CC #1, and CC #2 are configured as an Scell, Pcell, and Scell, respectively. In addition, the transmission power of the SRS of the Scell before power scaling is larger for the SRS on CC #2 than for the SRS on CC #0. FIG. 9 illustrates the operation to perform power scaling by preferentially dropping the SRS transmission on CC #0 configured as the Scell with smaller transmission power (or the smallest) when the total value of transmission power of the SRS channels on the three CCs transmitted as a plurality of CCs exceeds the UE-specific maximum transmission power in this situation.

Accordingly, since an SRS with smaller transmission power is more likely to fall below an SRS detection level capable of being received by an eNB (e.g., noise level at eNB), preferentially reducing the transmission power of the SRS of an Scell with smaller transmission power makes it possible to maintain the accuracy in measurement using the SRS of the Scell from which no transmission power is reduced, while maintaining highly accurate quality measurement on a Pcell.

Power Scaling Method 5

In power scaling method 5, when a plurality of SRSes of Scells is present, power scaling controlling section 109 uniformly reduces the transmission power of the plurality of SRSes of the Scells (reduces the same transmission power value or applies the same scaling (weighting)) (while keeping (not changing) the transmission power of the SRS of a Pcell).

Figure 10:
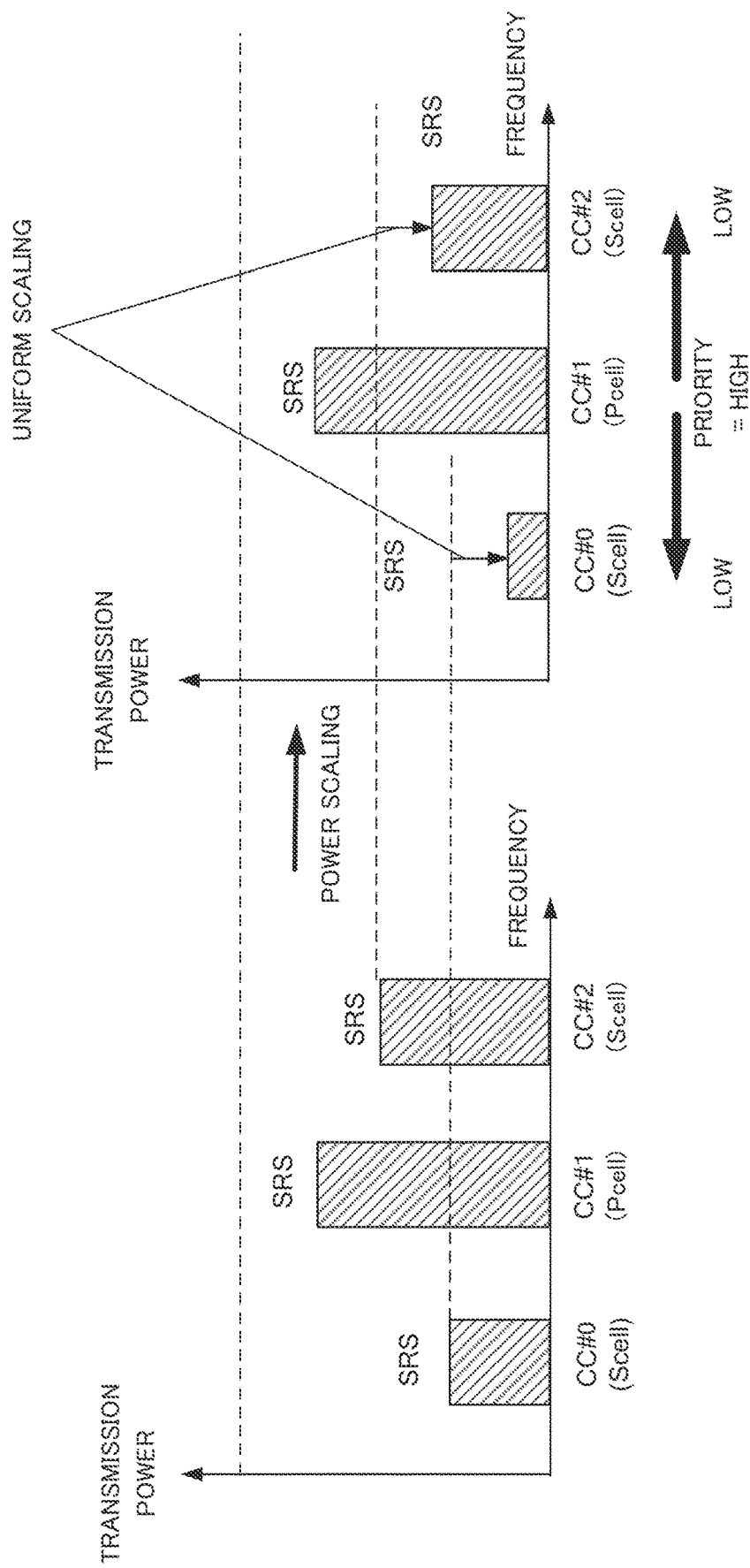
FIG. 10 is a diagram illustrating an overview of power scaling method 5.

FIG. 10 illustrates an overview of power scaling method 5. As in the case described above, the SRSes are simultaneously transmitted on the three CCs (CC #0 to CC #2) in FIG. 10. According to the control signal reported from the base station (via higher layer signaling), CC #0, CC #1, and CC #2 are configured as an Scell, Pcell, and Scell, respectively. FIG. 10 illustrates how the transmission power of CC #0 and CC #2 configured as the Scells is uniformly reduced when the total value of transmission power of the SRS channels on the three CCs transmitted as a plurality of CCs exceeds the UE-specific maximum transmission power in this situation. Examples of the method used to uniformly reduce the transmission power include a method to reduce the transmission power with the same value (true value or decibel value) or to apply the same scaling (weight) (applied in LTE-A). Meanwhile, as the scaling weight used for reducing the transmission power of SRSes, a scaling weight for SRSes may be used, or the same scaling weight as that for another uplink channel (e.g., PUSCH) may be used for SRSes. The term "scaling weight" used herein refers to a parameter that is previously reported to a terminal from an eNB.

Accordingly, it is possible to enable simplification of complex power allocation control between CCs while maintaining highly accurate quality measurement on a Pcell.

Power Scaling Method 6

In power scaling method 6, when a plurality of SRSes of Scells is present, power scaling controlling section 109 drops all the SRSes of the Scells (uniformly drops SRSes of Scells) (stops the transmission or sets the transmission power to be equal to zero).

Figure 11:
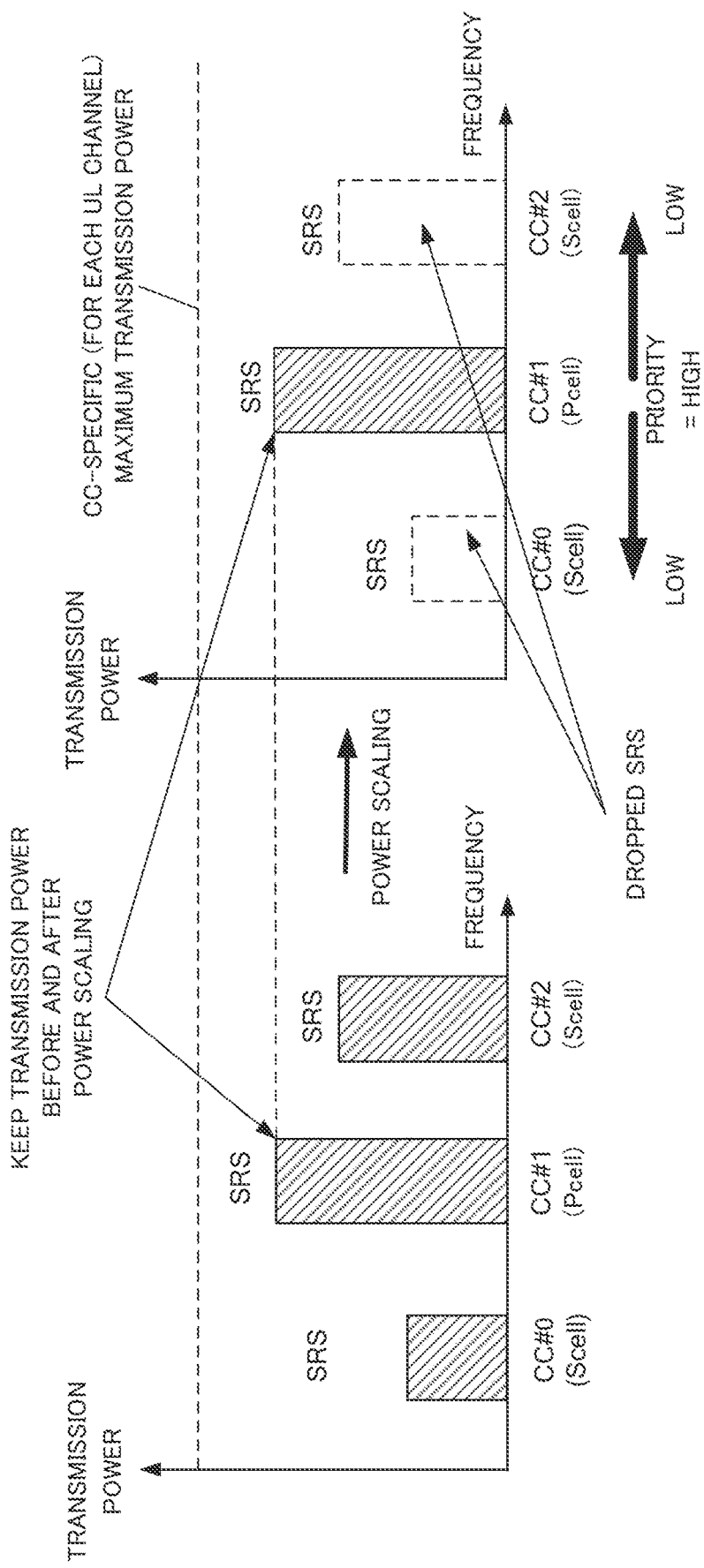
FIG. 11 is a diagram illustrating an overview of power scaling method 6.

FIG. 11 illustrates an overview of power scaling method 6. As in the case described above, the SRSes are simultaneously transmitted on the three CCs (CC #0 to CC #2) in FIG. 11. According to the control signal reported from the base station (via higher layer signaling), CC #0, CC #1, and CC #2 are configured as an Scell, Pcell, and Scell, respectively. FIG. 11 illustrates how the SRSes on CC #0 and CC #2 configured as the Scells are uniformly dropped when the total value of transmission power of the SRS channels of the three CCs transmitted as a plurality of CCs exceeds the UE-specific maximum transmission power in this situation.

Accordingly, it is possible to enable simplification of complex power allocation control between CCs while obtaining the effects similar to those obtained with power scaling method 3. In addition, the man hours for testing terminals (or eNBs) with respect to power scaling, which is indispensable for the commercialization of LTE can be significantly reduced. For example, although it is required to determine the specifications for testing all combinations of SRSes of a plurality of Scells to be transmitted, the man hours for the testing itself or for determining the specifications for the testing can be reduced.

It should be noted that, when a plurality of SRSes is present in Scells, instead of uniformly dropping all the SRSes, it is possible to drop the SRSes in (ascending/descending) order of the CC (cell) numbers.

Power Scaling Method 7

In power scaling method 7, when transmission power of a certain SRS of a plurality of SRSes is smaller than the SRS having the largest transmission power among the SRSes by at least the amount of a predetermined threshold, power scaling controlling section 109 reduces the transmission power of the certain SRS of the Scell or drops the certain SRS (stops the transmission or sets the transmission power to be equal to zero).

Figure 12:
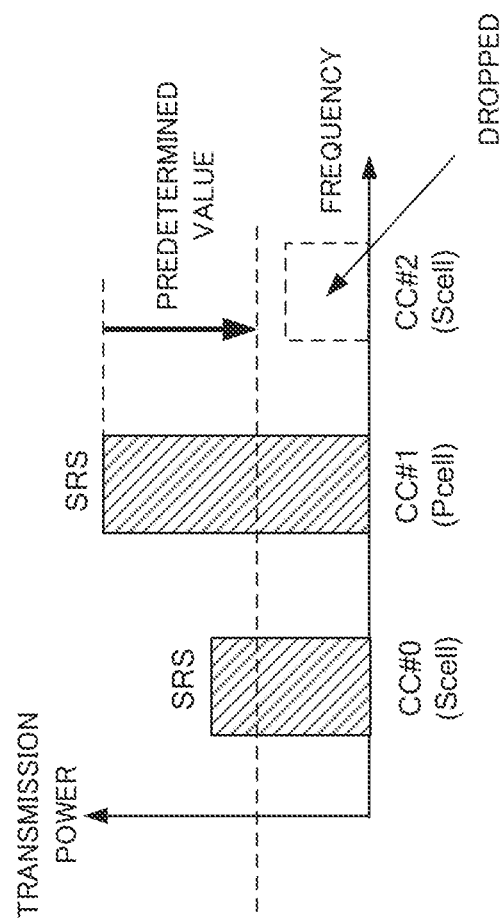
FIG. 12 is a diagram illustrating an overview of power scaling method 7.

FIG. 12 illustrates an overview of power scaling method 7. As in the cases described above, the SRSes are simultaneously transmitted on the three CCs (CC #0 to CC #2) in FIG. 12. According to the control signal reported from the base station (via higher layer signaling), CC #0, CC #1, and CC #2 are configured as an Scell, Pcell, and Scell, respectively. FIG. 12 illustrates how the SRS of the Scell is dropped when the total value of transmission power of the SRS channels of the three CCs transmitted as a plurality of CCs exceeds the UE-specific maximum transmission power and also when a difference between the transmission power of the SRS having the largest transmission power among the plurality of SRSes and the SRS of the Scell is at least a predetermined threshold in this situation described above. FIG. 12 illustrates a case where the difference between the transmission power of the SRS of the Scell of CC #2 and the transmission power of the SRS of the Pcell of CC #1, which is the largest among the plurality of SRSes, is at least a predetermined value.

When a difference in the transmission power of SRS between CCs is large, there occurs a situation where the intermodulation distortion of the SRS on the CC with larger transmission power becomes larger than the transmission power of the SRS on a different CC. The intermodulation distortion cannot be removed by a transmission filter. In other words, when the SRS is transmitted without removal of the intermodulation distortion, the eNB measures the communication quality of the CC by the SRS affected by the intermodulation distortion. As a result, correct scheduling or transmission power control cannot be performed. Accordingly, this problem can be avoided by dropping the SRS of the Scell when the difference between the largest SRS transmission power and the SRS transmission power of the Scell is at least a predetermined threshold.

As a method of setting the threshold, it is possible to set a certain value and to adaptively change the value according to a path-loss (measurement) value.

In addition, instead of the transmission power of an SRS having the largest transmission power among a plurality of SRSes, the transmission power of a channel having the largest transmission power among UL channels to be simultaneously transmitted may be set as the reference value. Accordingly, the same effects can be obtained with this configuration.

Power Scaling Method 8

In power scaling method 8, when transmission power of a certain SRS of an Scell is not greater than a predetermined threshold, power scaling controlling section 109 reduces the transmission power of the SRS of the Scell or drops the SRS (stops the transmission or sets the transmission power to be equal to zero).

Figure 13:
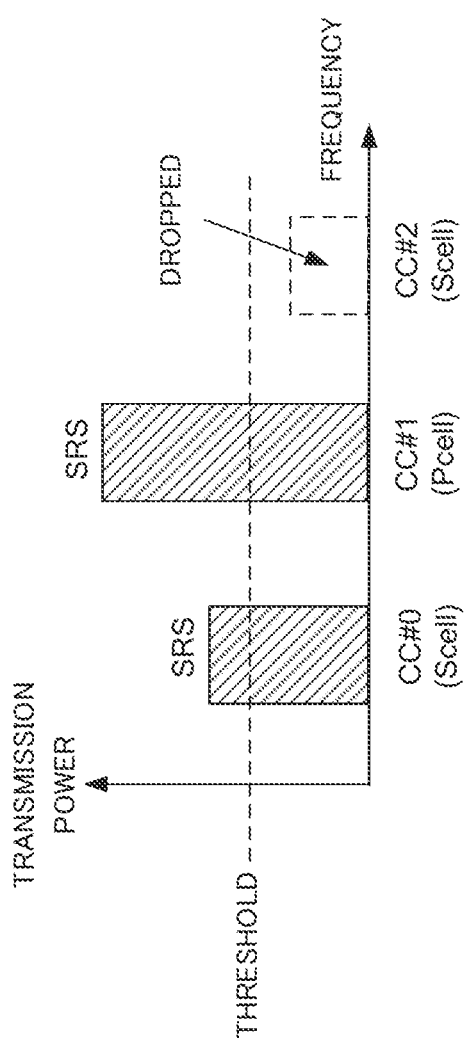
FIG. 13 is a diagram illustrating an overview of power scaling method 8.

FIG. 13 illustrates an overview of power scaling method 8. As in the cases described above, the SRSes are simultaneously transmitted on the three CCs (CC #0 to CC #2) in FIG. 13. According to the control signal reported from the base station (via higher layer signaling), CC #0, CC #1, and CC #2 are configured as an Scell, Pcell, and Scell, respectively. FIG. 13 illustrates how the SRS of the Scell is dropped when the total value of transmission power of the SRS channels of the three CCs transmitted as a plurality of CCs exceeds the UE-specific maximum transmission power and also when the transmission power of the plurality of SRSes of the Scell is not greater than a certain threshold in this situation described above.

When the transmission power of an SRS on a CC is too small, the transmission signal cannot be correctly expressed with the resolution of the digital/analog (D/A) converter of the terminal (transmission side). However, the introduction of a threshold and dropping an SRS having transmission power not greater than the threshold make it possible to avoid unnecessary transmission processing (i.e., complex designing of D/A taking into account (covering) low transmission power values) (consuming unnecessary transmission power can be avoided).

Power Scaling Method 9

In power scaling method 9, power scaling controlling section 109 selects an SRS on a CC to be dropped (e.g., power allocation priority is lowered, transmission power is reduced, transmission is stopped, or transmission power is set equal to zero), in accordance with the length of the transmission cycle of a periodic SRS. Specifically, power scaling controlling section 109 selects a periodic SRS of a long transmission cycle as the SRS on a CC to be preferentially dropped or a periodic SRS of a short transmission cycle as the SRS on a CC to be preferentially dropped.

When an SRS of a long transmission cycle is selected as the SRS on a CC to be preferentially dropped, it is possible to obtain the same effects as those obtained with power scaling method 3 and also to preferentially follow short-term channel variation and achieves adaptive modulation and channel coding (AMC) in accordance with short-term fading variation and also to control time-frequency domain scheduling with high accuracy. Thus, UE-specific throughput and system throughput by multi-user diversity can be improved.

When an SRS of a short transmission cycle is selected as the SRS on a CC to be preferentially dropped, it is possible to obtain the same effects as those obtained with power scaling method 3 and also to improve the long-term channel measurement accuracy. Thus, cross-carrier scheduling control, which adaptively selects a CC used for transmitting data and control information, can be performed with high accuracy.

Power Scaling Method 10

In power scaling method 10, power scaling controlling section 109 selects an SRS on a CC to be dropped (e.g., power allocation priority is lowered, transmission power is reduced, transmission is stopped, or transmission power is set equal to zero), in accordance with the bandwidth of each SRS. Specifically, an SRS having a wide bandwidth is preferentially dropped over an SRS having a narrow bandwidth, or an SRS having a narrow bandwidth is preferentially dropped over an SRS having a wide bandwidth.

When an SRS having a wide bandwidth is preferentially dropped over an SRS having a narrow bandwidth, the following effects can be obtained. The transmission power of a UL channel (such as PUSCH and SRS) of LTE-A (LTE) is determined based on the transmission bandwidth and power spectrum density (PSD). Thus, reducing the transmission power allocation priority of an SRS having a wide bandwidth that has a large influence on the size of the total transmission power makes it possible to minimize the number of SRSes to be dropped. For example, provided that the total bandwidth of SRSes on a plurality of CCs is defined as B, comparing the case where the bandwidth of the SRS on one CC is B with the case where the bandwidth of each of the SRSes on two CCs is B/2, the number of CCs to be dropped can be smaller when the SRS on one CC is preferentially dropped. Such a decrease in the number of CCs to be dropped is very advantageous when sounding on as many CCs as possible using SRSes is performed to select a CC for transmitting data, control information and/or the like. In addition, since a wider bandwidth involves larger intermodulation distortion, reducing the power allocation priority for an SRS having a wide bandwidth can reduce the influence of out-of-band leakage (intermodulation distortion) over a wide range on a different CC.

It is also possible to introduce a threshold into the bandwidth determination and to preferentially drop a corresponding SRS when a bandwidth between SRSes or a difference between bandwidths of SRSes exceeds the threshold.

In addition, the larger the ratio of an SRS bandwidth to a CC bandwidth (e.g., SRS bandwidth/CC bandwidth) is, the more the power allocation priority for the corresponding SRS on the CC may be lowered.

Meanwhile, when an SRS having a narrow bandwidth is preferentially dropped over an SRS having a wide bandwidth, the following effects can be obtained. When a high quality frequency resource is assigned by measuring a propagation channel over a wide bandwidth of only one CC, a wide range frequency band can be measured at once.

It is also possible to introduce a threshold into the bandwidth determination and to drop a corresponding SRS when a bandwidth between SRSes or a difference between the bandwidths of the SRSes exceeds the threshold.

In addition, the smaller the ratio of an SRS bandwidth to a CC bandwidth (e.g., SRS bandwidth/CC bandwidth) is, the more the power allocation priority for the corresponding SRS on the CC may be lowered.

Power Scaling Method 11

In power scaling method 11, when a plurality of SRSes of Scells is present, power scaling controlling section 109 raises the power allocation priority for the SRS on a CC on which UCI is triggered (to be triggered) by control information included in a physical layer control channel PDCCH (UL or DL grant) or control information reported (to be reported) via higher layer signaling, of the plurality of SRSes of the Scells. For example, power scaling controlling section 109 raises the power allocation priority for the SRS on a CC on which UCI such as aperiodic CSI is triggered. On the other hand, when a plurality of SRSes of Scells is present, power scaling controlling section 109 lowers (preferentially drops, reduces the transmission power, stops transmission, or sets the transmission power to be equal to zero) the power allocation priority for the SRS on a CC on which no UCI is triggered (no UCI has been triggered) by control information included in a physical layer control channel PDCCH (UL or DL grant) or control information reported (to be reported) via higher layer signaling, of the plurality of SRSes. For example, power scaling controlling section 109 lowers the power allocation priority for the SRS on a CC on which UCI such as aperiodic CSI is not triggered (has not been triggered) by any UL grant.

Figure 14:
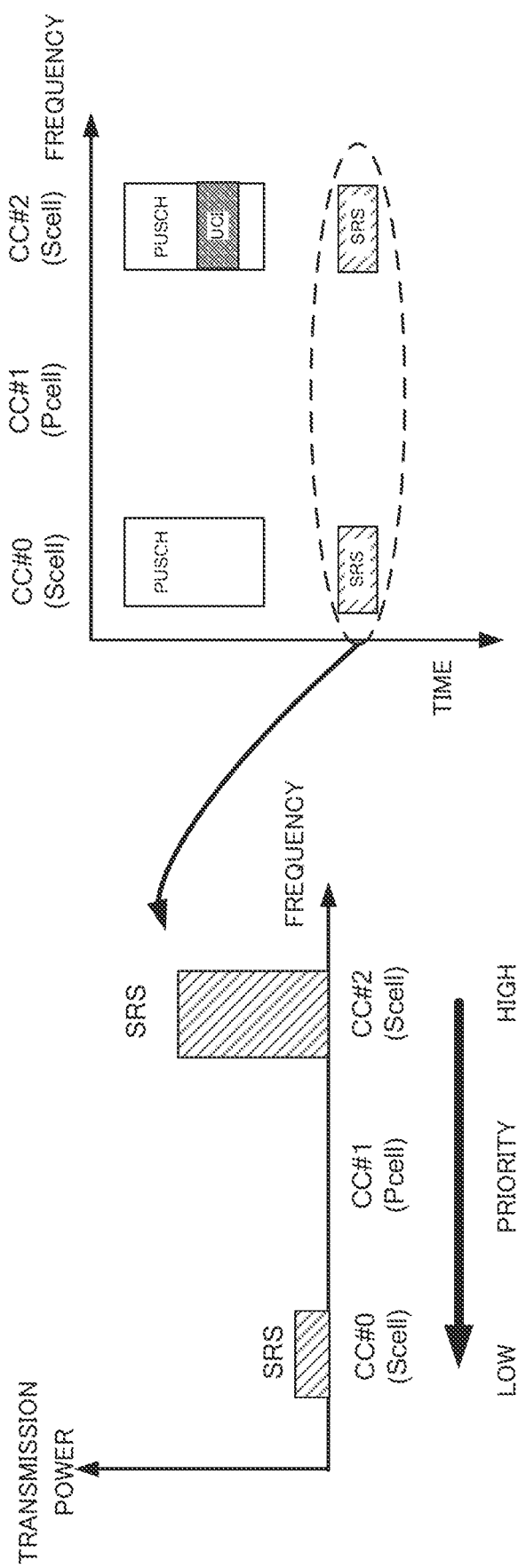
FIG. 14 is a diagram illustrating an overview of power scaling method 11.

FIG. 14 illustrates an overview of power scaling method 11. As in the cases described above, the SRSes are simultaneously transmitted on the two CCs (CC #0 and CC #2) in FIG. 14. According to the control signal reported from the base station (via higher layer signaling), CC #0, CC #1, and CC #2 are configured as an Scell, Pcell, and Scell, respectively. When the total value of transmission power of the SRS channels of the two CCs transmitted as a plurality of CCs exceeds the UE-specific maximum transmission power, the power allocation priority for the SRS on a CC on which UCI such as aperiodic CSI is triggered (to be triggered) by a UL grant is raised, of the two SRSes of the two Scells. FIG. 14 illustrates a situation where UCI has been triggered on the Scell of CC #2 in a previous subframe while no UCI has been triggered on CC #0.

Accordingly, the same effects as those obtained with power scaling methods 1 and 3 can be obtained among a plurality of Scells (SCCs).

The priority for the Scell on which UCI has been triggered may be kept for a certain period. Moreover, the priority for the Scell may be kept until UCI is triggered on a different CC. In addition, when there is a plurality of Scells on which UCI has been triggered, SRS power scaling may be performed according to the latest trigger information. When there is a plurality of Scells on which UCI has been triggered and also the UCI has been triggered at the same time, power scaling priority may be determined in accordance with UL CC ID numbers (in ascending or descending order).

Power Scaling Method 12

In power scaling method 12, power scaling controlling section 109 preferentially drops an SRS having a low PSD over an SRS having a high PSD (lowers the power allocation priority, reduces the transmission power, stops the transmission, or sets the transmission power to be equal to zero).

When a difference in PSD of SRS between CCs is large, the intermodulation distortion of the SRS on the CC having a higher PSD may become larger than a PSD of an SRS on a different CC. This intermodulation distortion cannot be removed by a transmission filter. Specifically, when the SRS is transmitted without removal of the intermodulation distortion, the eNB measures the communication quality of the CC by the SRS affected by the intermodulation distortion. As a result, correct scheduling or transmission power control cannot be performed. With respect to this problem, transmission of only an SRS having a high PSD, which is unlikely to be affected by the intermodulation distortion, allows an eNB to perform measurement on the CC with high accuracy.

Figure 15:
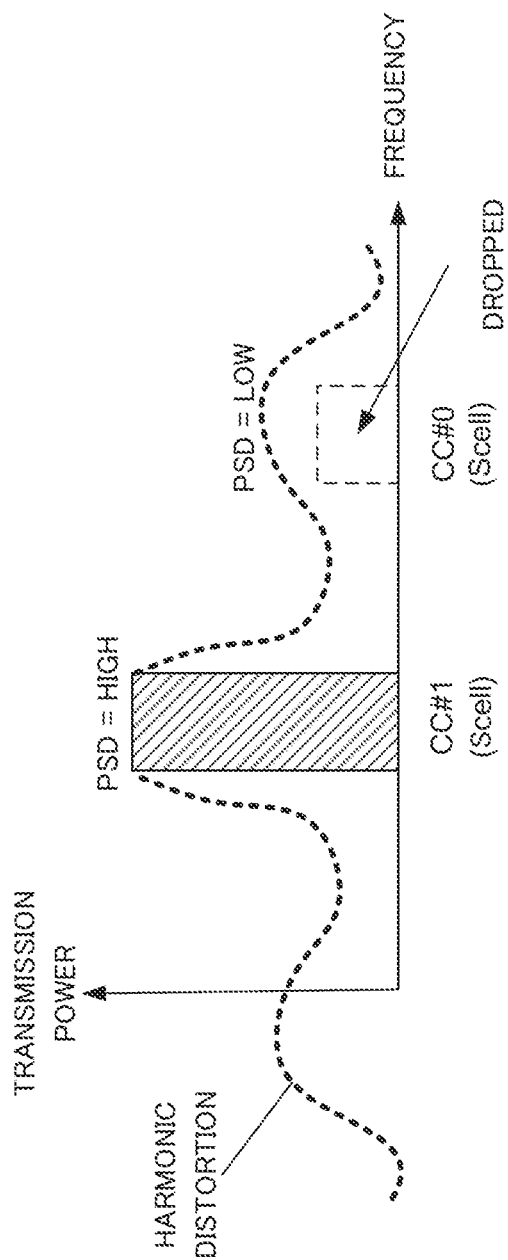
FIG. 15 is a diagram illustrating an overview of power scaling method 12.

FIG. 15 illustrates an overview of power scaling method 12. In FIG. 15, as in the cases described above, the SRSes are simultaneously transmitted on the two CCs (CC #0 and CC #1) in FIG. 15. According to the control signal reported from the base station (via higher layer signaling), CC #0 and CC #1 are each configured as an Scell. In FIG. 15, the dotted line indicates harmonic distortion (intermodulation distortion). Under this condition, an SRS having a low PSD that is likely to be affected by intermodulation distortion is dropped.

It should be noted that, a transmission power control parameter (PUSCH or SRS) related to calculating a PSD value may be used to determine the SRS to be dropped. Examples of the parameter includes a TPC command accumulation value, transport block size, offset parameter related to an MCS level (TF), SRS offset value with respect to PUSCH transmission power, and the number of bits per RE (TB size/the number of allocated REs). When these values are high, the corresponding SRS has a higher PSD. Thus, the SRS to be dropped may be determined based on these values. In addition, when the number of allocated resource elements (REs) or the number of allocated subcarriers is small, the corresponding SRS has a higher PSD. Thus, the SRS to be dropped may be determined based on these values.

In addition, it is also possible to introduce a threshold for PSDs or the abovementioned parameters and to preferentially drop the corresponding SRS when these values exceed the threshold.

As described above, according to Embodiment 1, when power scaling occurs in simultaneous transmission of SRSes using a Pcell and Scell, the transmission power is preferentially allocated with respect to the SRS of a Pcell over the SRS of an Scell. Thus, it is possible to reduce the probability of a CC that transmits an SRS with low power allocation priority being identical to a CC on which UCI is multiplexed. Accordingly, the propagation channel quality information on a Pcell on which UCI is likely to be multiplexed can be estimated with high accuracy using an SRS having high power allocation priority, which in turn allows an eNB to indicate appropriate transmission power for a subsequent UL channel on which UCI is transmitted.

It should be noted that, although a description has been given regarding the situation between CCs, the methods described above may be applied to a plurality of SRSes on a CC.

In addition, the power scaling methods described above may be used in combination.

Moreover, the methods that have been described with an assumption that they are applied to a plurality of SRSes on a plurality of Scells may be applied in the same manner when a plurality of SRSes on Pcell or a plurality of SRSes on a plurality of Pcells is present.

Furthermore, as a method of reducing the transmission power of an SRS with low power allocation priority, an SRS scaling weight reported from an eNB to a terminal (via higher layer signaling) may be used to reduce the transmission power.

When w_Pcell_SRS and w_Scell_SRS are defined as the scaling weights applied to SRSes of a Pcell and Scell respectively, the scaling weights may be set (defined) to satisfy w_Pcell_SRS>w_Scell_SRS. Alternatively, the scaling weights may be defined to satisfy w_Pcell_SRS=1, and w_Scell_SRS<1.

In addition, although a description has been given regarding priority between a plurality (periodic or aperiodic) SRSes when power scaling occurs, the method to be described below may be used for power allocation priority between an (periodic or aperiodic) SRS and another UL channel (such as PUCCH or PUSCH).

Power Scaling Method 13

Figure 16:
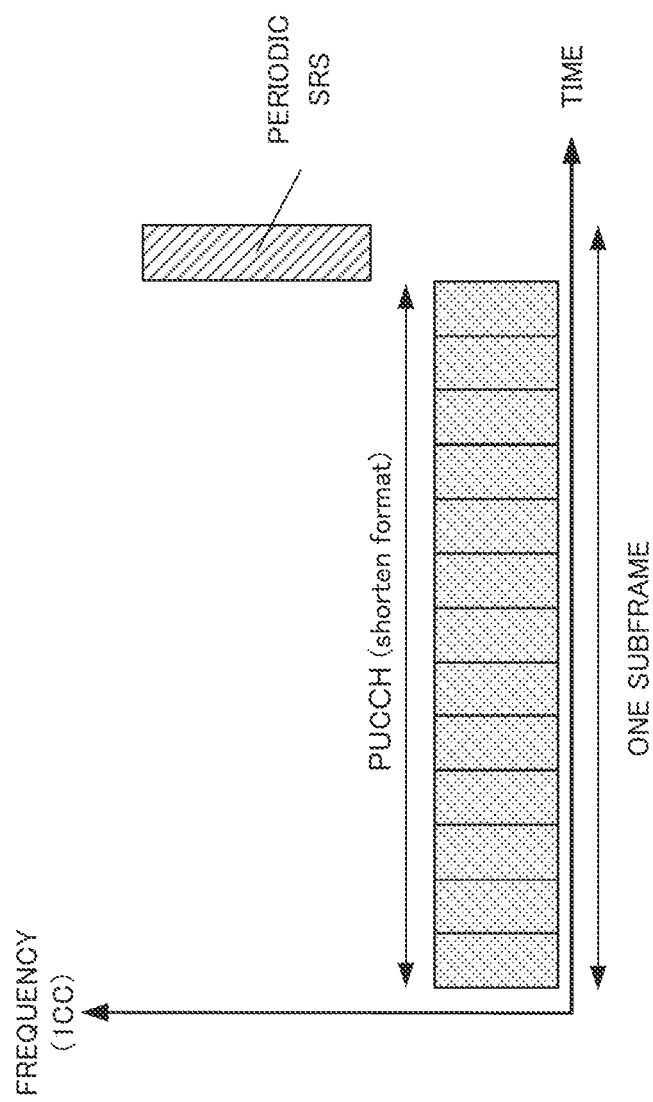
FIG. 16 is a diagram illustrating a configuration in which a PUCCH and a periodic SRS are multiplexed in a subframe.

In power scaling method 13, simultaneous transmission of an (periodic or aperiodic) SRS and a PUCCH is performed using only one CC having a bandwidth of 20 MHz or the like in Release 8 LTE. For simultaneous transmission of an (periodic or aperiodic) SRS and a PUCCH on one CC, in order to avoid an increase in peak-to-average power ratio (PAPR) of the transmission signal (multi-carrier transmission), a PUCCH in a shortened format not transmitting the last SC-FDMA symbol of one subframe by rate matching is used for the PUCCH, and only a periodic SRS is transmitted on the last SC-FDMA symbol of one subframe (see, FIG. 16).

Meanwhile, studies have been carried out on introducing simultaneous transmission on a plurality of CCs including a CC transmitting a PUCCH and a CC transmitting an SRS into LTE-A, which uses a plurality of CCs. Accordingly, power scaling needs to be performed when the transmission power exceeds the UE-specific maximum transmission power in simultaneous transmission of a PUCCH and an SRS on CCs using the last SC-FDMA symbol of one subframe. Stated differently, it is necessary to determine power allocation priority for the PUCCH and SRS.

NPL 1 discloses the following priority used when power scaling occurs.

PUCCH>SRS>PUSCH

NPL 1, however, has the following problems when an (periodic or aperiodic) SRS and a PUCCH are simultaneously transmitted. Specifically, as described above, when the transmission power of an SRS is reduced (halfway) so as to satisfy the requirement with respect to the UE-specific maximum transmission power on the basis of the rule that indicates the power allocation priority for the transmission power of an SRS is lower than the transmission power of a PUCCH, the eNB does not have any information indicating when power scaling has occurred in a terminal and/or the like, basically. For this reason, the eNB erroneously recognizes the reason for reduction in the SRS reception level as being deterioration in the quality of the mobile communication channel, which easily changes with time, instead of the occurrence of power scaling in the terminal. In addition, the eNB reports an instruction to use a large transmission power value (small MCS value) not less than a value required to satisfy predetermined reception quality for subsequent transmission of a UL channel (on which UCI is multiplexed) such as a PUSCH. Stated differently, transmission of a UL channel is performed with excessive quality during transmission of a subsequent UL channel such as a PUSCH in this case (co-channel interference to another cell is increased when an instruction to increase the transmission power is transmitted. In addition, another problem such as an unnecessary increase in the power consumption of the terminal is caused).

In this respect, in a power scaling method used in simultaneous transmission of an (periodic/aperiodic) SRS and a PUCCH, power scaling controlling section 109 performs power scaling by keeping (not changing) the transmission power of a PUCCH on a Pcell, and dropping (stopping the transmission or setting the transmission power to be equal to zero) an SRS of an Scell.

Figure 17:
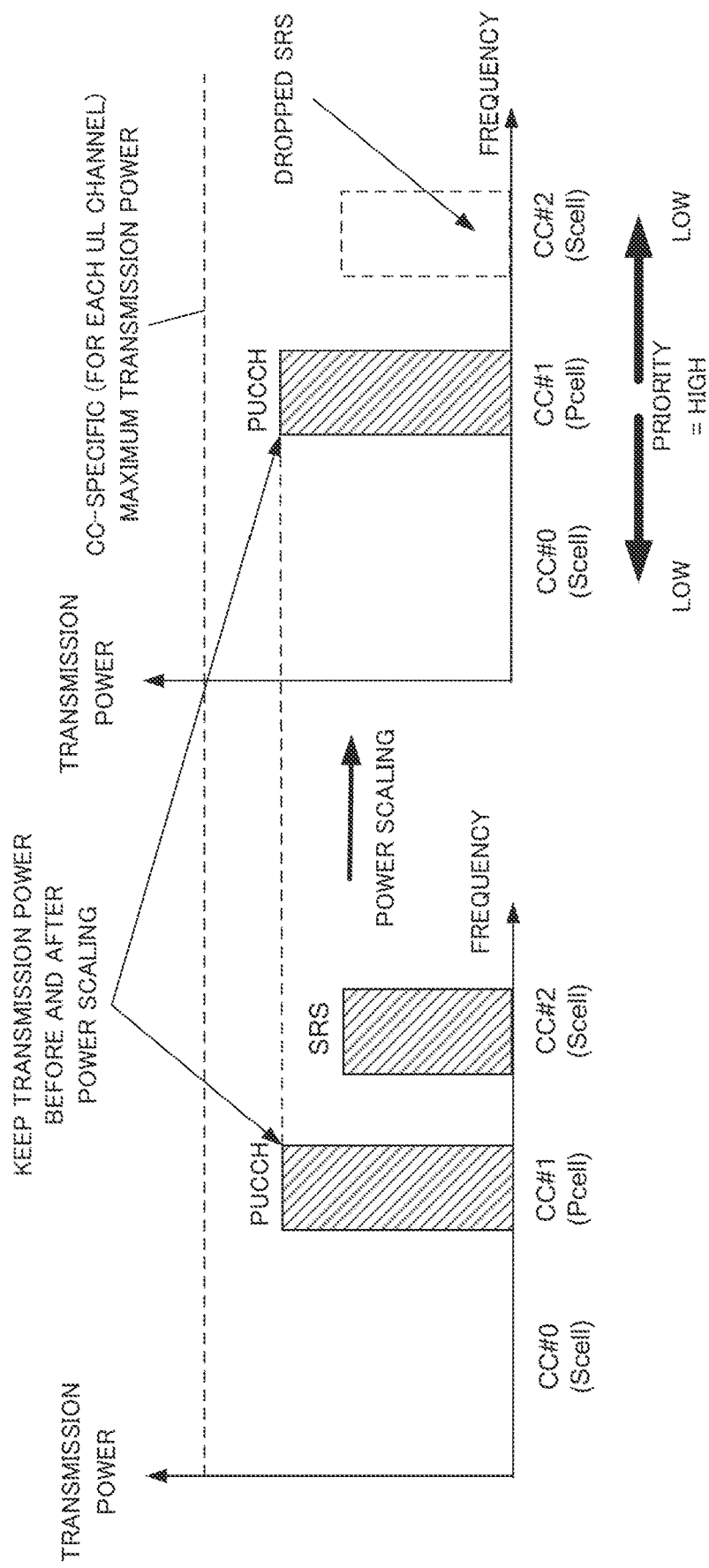
FIG. 17 is a diagram illustrating an overview of power scaling method 13.

FIG. 17 illustrates an overview of power scaling method 13. In FIG. 17, a PUCCH on CC #1 and an SRS on CC #2 are simultaneously transmitted while no transmission is performed on CC #0. According to the control signal reported from the base station (via higher layer signaling), CC #0, CC #1, and CC #2 are configured as an Scell, Pcell, and Scell, respectively. FIG. 17 illustrates the operation to perform power scaling by keeping (i.e., not changing) the transmission power of the PUCCH on CC #1 configured as a Pcell, and dropping the SRS on CC #2 configured as an Scell, when the total value of transmission power of the PUCCH and the SRS channel transmitted on the plurality of CCs exceeds the UE-specific maximum transmission power in this situation.

Figure 18:
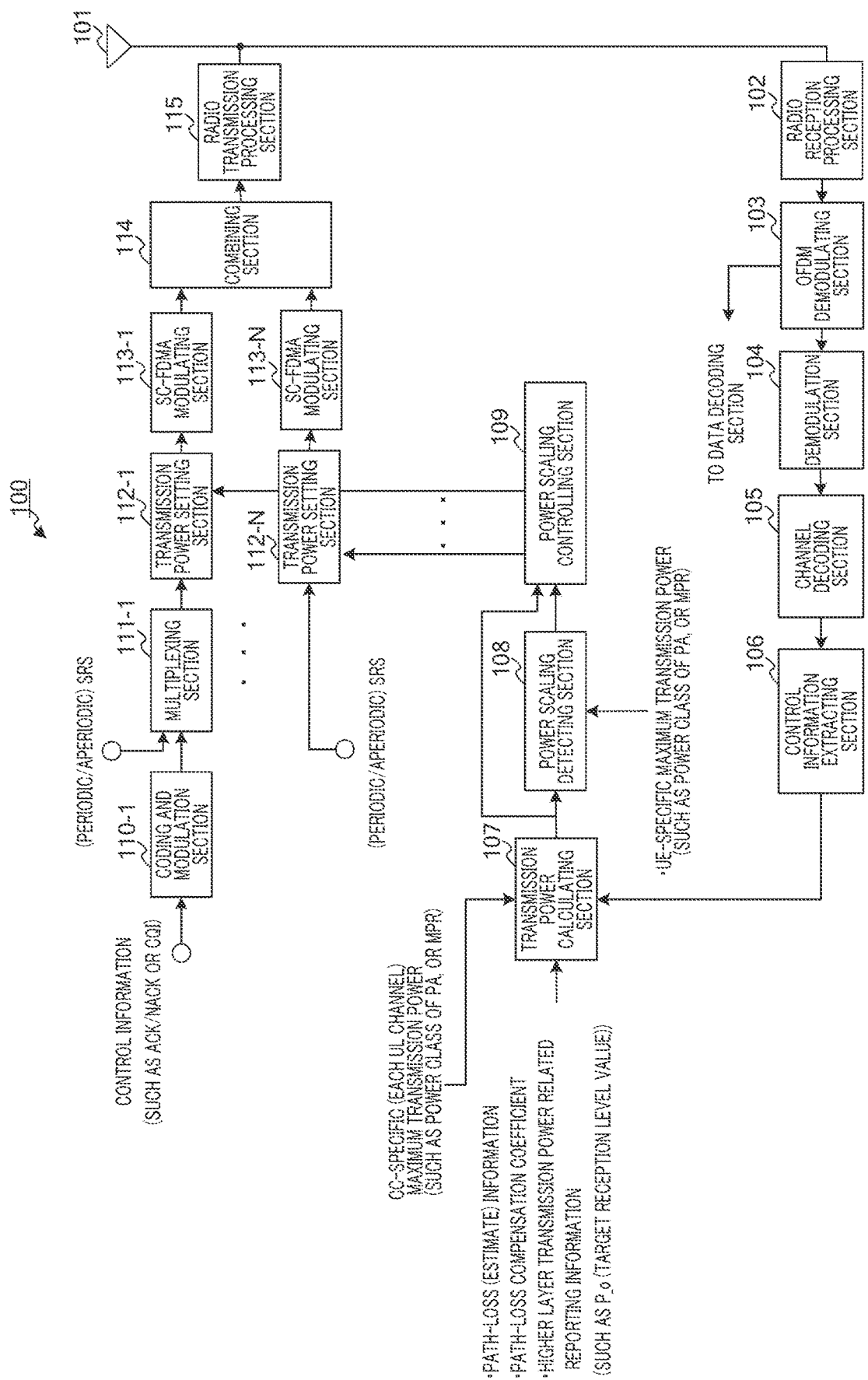
FIG. 18 is a block diagram illustrating a configuration of a radio communication terminal apparatus according to Embodiment 1 of the present invention.

FIG. 18 illustrates a configuration of a transmitter used in simultaneous transmission of a PUCCH and an SRS on different CCs. In FIG. 18, coding and modulation section 110-1 receives, as input, control information (such as ACK/NACK or CQI) transmitted on a PUCCH and performs the processing similar to that described in the embodiment. The transmission power of the PUCCH is set in transmission power configuring section 112-1 on the basis of the information received from power scaling controlling section 109. The processing performed hereinafter is the same as that described above (see, FIG. 2). Thus, the description of the processing is omitted herein. Meanwhile, for the CC on which the SRS is transmitted, transmission power configuring section 112-1 receives the SRS, and sets the transmission power of the SRS on the basis of the information received from power scaling controlling section 109.

Accordingly, dropping the SRS of an Scell enables simplification of complex power allocation control between CCs in addition to obtaining the effects brought about by power scaling method 3. In addition, the man hours for testing can be reduced in the same manner described above.

In addition, when a UE miss-detects trigger information on an aperiodic SRS, which is newly introduced into LTE-A and is reported on a physical layer control channel PDCCH, the UE transmits no SRS (transmission power for the corresponding CC (resource)=0). More specifically, it is possible to configure UEs to perform the equivalent operation when power scaling occurs and when miss-detection of a UE occurs (for simplification). Accordingly, it is made possible for an eNB to support, by a single operation, the cases where power scaling occurs and where miss-detection of a UE occurs. For example, when an eNB can measure only a reception SRS level equal to a noise level during an SRS reception period in blind-detection processing of SRS receiving power in the eNB, the eNB can support both of the abovementioned cases by the single operation, which is to instruct the terminal to retransmit (trigger) an SRS with an appropriate transmission power value for the SRS again.

It should be noted that, when a plurality of SRSes is present on a plurality of Scells, all the SRSes of the Scells may be dropped. Furthermore, the power scaling methods used when a plurality of SRSes is present on a plurality of Scells may be used.

Although a description has been given regarding the case where power scaling occurs in simultaneous transmission of an SRS and a PUCCH, it is possible to transmit an SRS and a PUCCH on a plurality of CCs when no power scaling occurs.

Power Scaling Method 14

Figure 19:
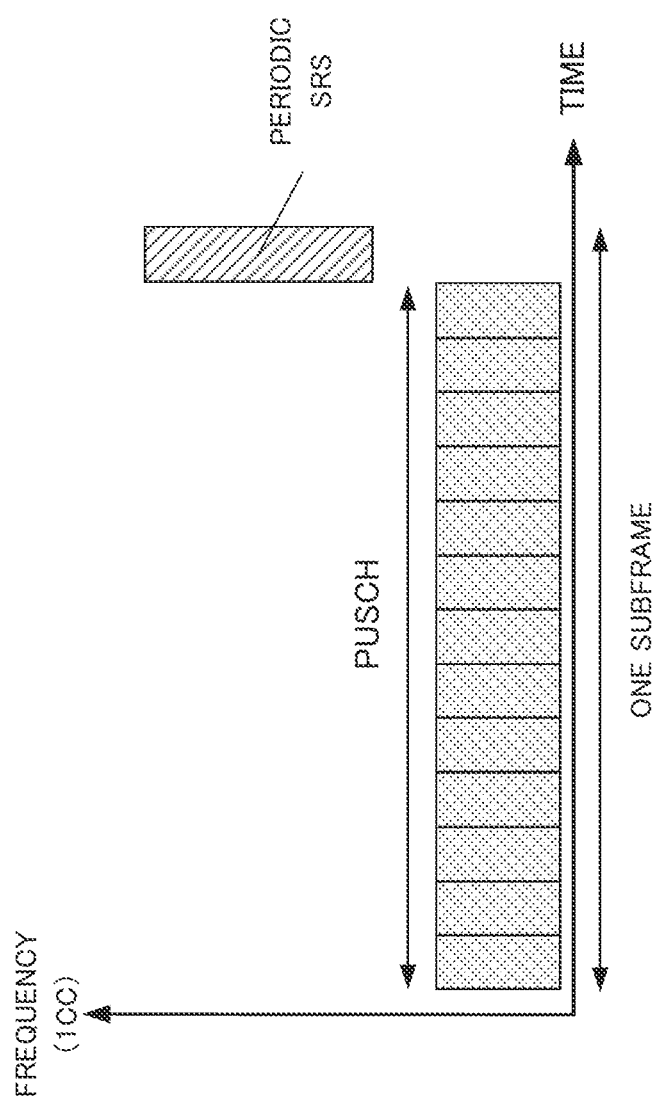
FIG. 19 is a diagram illustrating a configuration in which a PUSCH and a periodic SRS are multiplexed in a subframe.

In power scaling method 14, simultaneous transmission of an (periodic or aperiodic) SRS and a PUSCH is performed using only one CC having a bandwidth of 20 MHz or the like in Release 8 LTE. For simultaneous transmission of an (periodic or aperiodic) SRS and a PUSCH on one CC, in order to avoid an increase in peak-to-average power ratio (PAPR) of the transmission signal (multi-carrier transmission), a PUSCH in a shortened format not transmitting the last SC-FDMA symbol of one subframe by rate matching (puncturing) is used for the PUSCH, and only a periodic SRS is transmitted on the last SC-FDMA symbol of one subframe (see, FIG. 19).

Meanwhile, studies have been carried out on introducing simultaneous transmission on a plurality of CCs including a CC transmitting a PUSCH and a CC transmitting an SRS into LTE-A, which uses a plurality of CCs. Accordingly, power scaling needs to be performed when the transmission power exceeds the UE-specific maximum transmission power in simultaneous transmission of a PUSCH and an SRS on CCs using the last SC-FDMA symbol of one subframe. Stated differently, it is necessary to determine power allocation priority for the PUCCH and SRS.

As described above, NPL 1 discloses the following priority used when power scaling occurs.

PUCCH>SRS>PUSCH

NPL 1, however, has the following problems when an (periodic or aperiodic) SRS and a PUSCH are simultaneously transmitted. Specifically, as described above, when the transmission power of a PUSCH is reduced (halfway) so as to satisfy the requirement with respect to the UE-specific maximum transmission power on the basis of the rule that indicates the power allocation priority for the transmission power of a PUSCH is lower than the transmission power of an SRS, the probability that the eNB cannot correctly receive multiple amplitude shift keying subjected to power scaling is increased when multiple amplitude shift keying such as 16QAM or 64QAM is used on data transmitted on the PUSCH (or control information). For example, the probability is increased that the modulation accuracy and error vector magnitude (EVM) of the multilevel modulation signal subjected to power scaling no longer satisfy a predetermined condition at the time of transmission due to power scaling. In addition, although the information on multiple amplitude shift keying such as 16QAM is indicated by amplitude (square root of power), the eNB basically has no information indicating when power scaling has occurred in a terminal and/or the like, for example. Accordingly, the eNB demodulates and decodes the signal with an assumption that no power scaling is applied to the PUSCH. Thus, the probability of the eNB not correctly receiving the signal is increased.

In this respect, in power scaling method 14 used in simultaneous transmission of a (periodic/aperiodic) SRS and a PUSCH, power scaling controlling section 109 performs power scaling by keeping (not changing) the transmission power of the PUSCH, and dropping (stopping the transmission or setting the transmission power to be equal to zero) the transmission power of the SRS (of Scell).

Accordingly, dropping the SRS of an Scell enables simplification of complex power allocation control between CCs in addition to obtaining the effects similar to those brought about by power scaling method 3. In addition, the man hours for testing can be reduced in the same manner described above.

Moreover, it is possible to avoid the abovementioned problems with a PUSCH and also to increase the probability of multiple amplitude shift keying such as 16QAM, being correctly transmitted.

Figure 20:
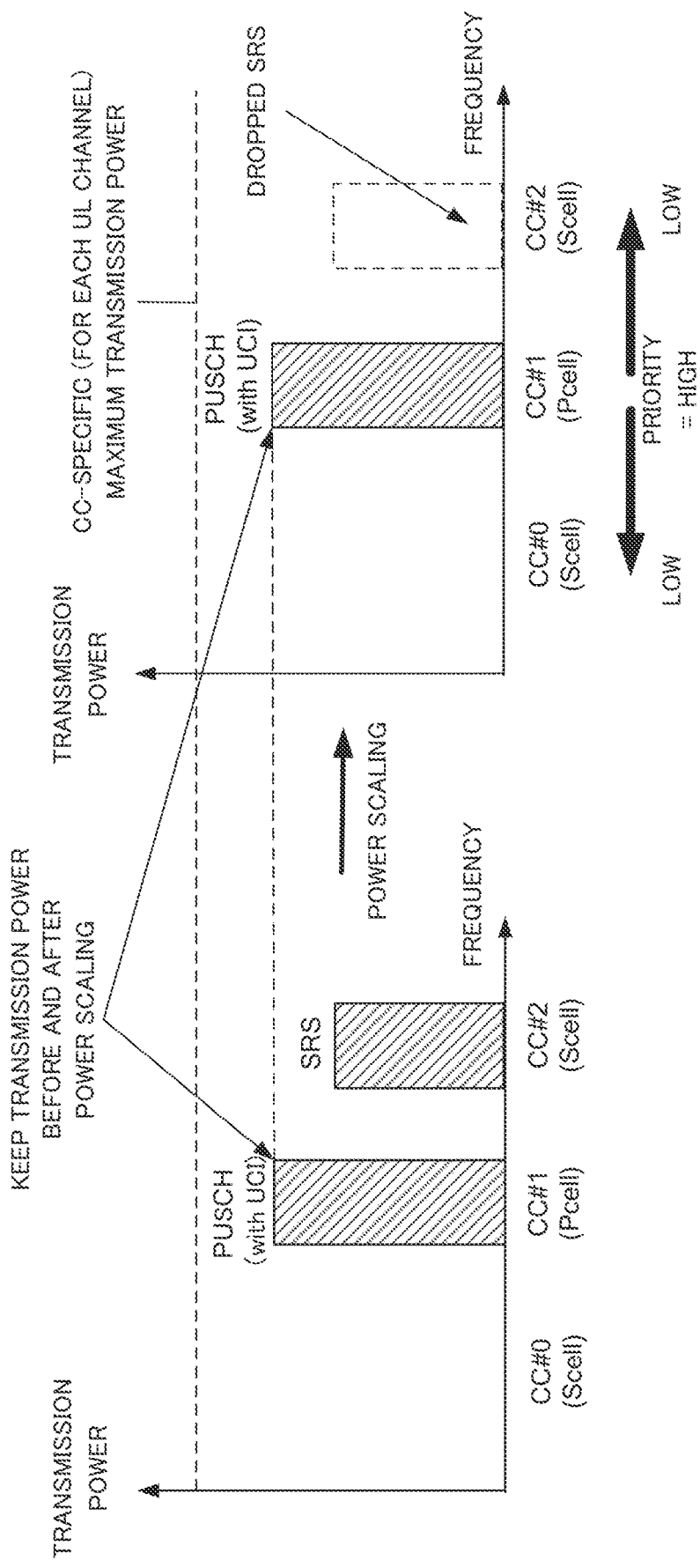
FIG. 20 is a diagram illustrating an overview of power scaling method 14.

FIG. 20 illustrates an overview of power scaling method 14. In FIG. 20, a PUCCH (with UCI) on CC #1 and an SRS on CC #2 are simultaneously transmitted while no transmission is performed on CC #0. According to the control signal reported from the base station (via higher layer signaling), CC #0, CC #1, and CC #2 are configured as an Scell, Pcell, and Scell, respectively. FIG. 20 illustrates the operation to perform power scaling by keeping (i.e., not changing) the transmission power of the PUSCH (with UCI) on CC #1, and dropping the SRS on CC #2 configured as an Scell, when the total value of transmission power of the PUSCH (with UCI) and the SRS channel transmitted on a plurality of CCs exceeds the UE-specific maximum transmission power in this situation.

It is favorable to use power scaling method 14 as a power scaling method used when UCI is multiplexed on a PUSCH, i.e., when a PUSCH on which UCI is multiplexed and a (periodic or aperiodic) SRS are simultaneously transmitted. Accordingly, the probability that the UCI which has high priority and to which no retransmission is applied is correctly transmitted to an eNB can be increased.

Power Scaling Method 15

When no UCI is multiplexed on a PUSCH, power scaling controlling section 109 may perform power scaling by keeping (i.e., not changing) the transmission power of the SRS, and dropping (stopping the transmission or setting the transmission power to be equal to zero) the transmission power of the PUSCH as power scaling method 15 used for the situation opposite to that of power scaling method 14 and used when an (periodic or aperiodic) SRS and a PUSCH are simultaneously transmitted. The priority for an SRS with respect to a PUSCH on which no UCI is multiplexed, i.e., PUSCH without UCI to which retransmission is applied can be raised. Thus, the measurement accuracy using an SRS can be increased as in the case of power scaling method 3 while simple power allocation processing is performed between CCs.

Figure 21:
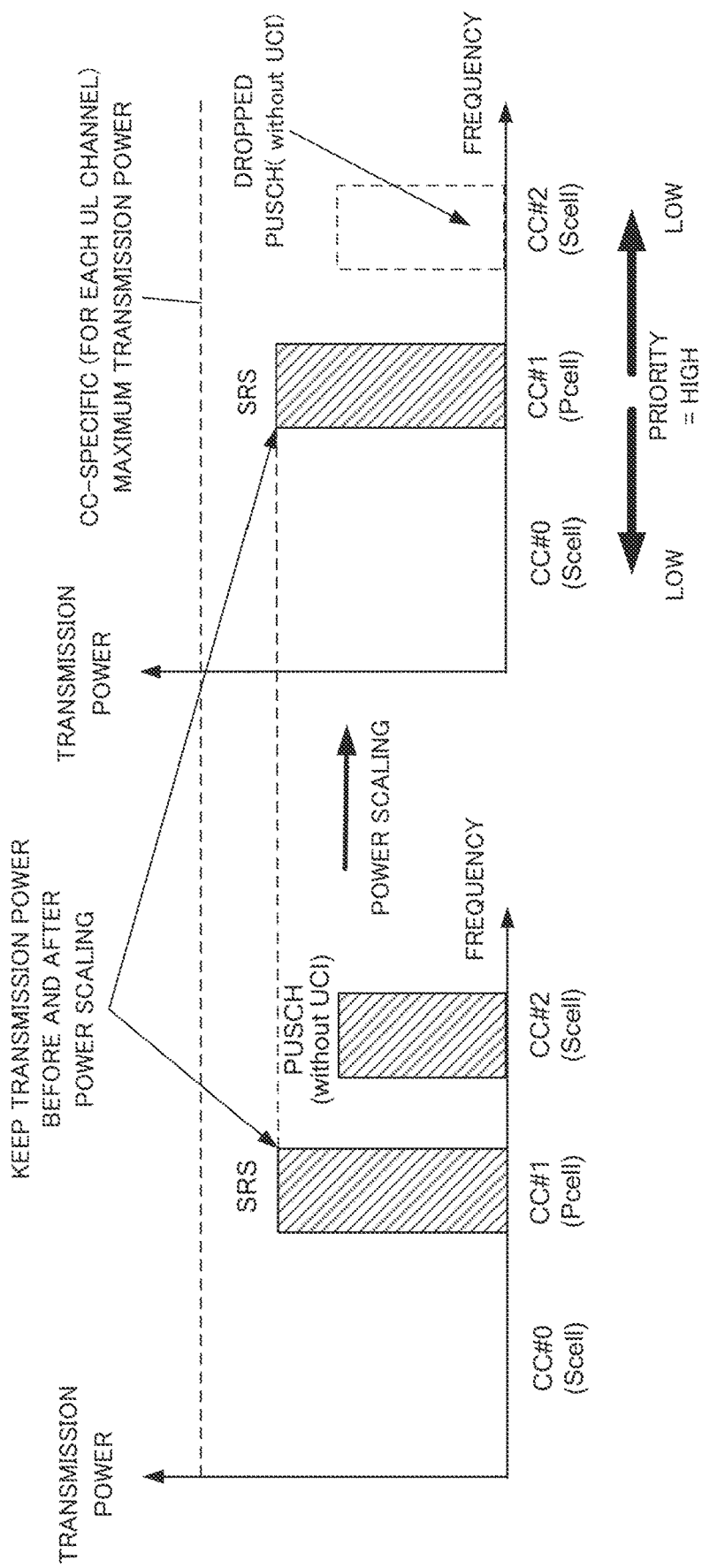
FIG. 21 is a diagram illustrating an overview of power scaling method 15.

FIG. 21 illustrates an overview of power scaling method 15. In FIG. 21, an SRS on CC #1 and a PUCCH (without UCI) on CC #2 are simultaneously transmitted while no transmission is performed on CC #0. According to the control signal reported from the base station (via higher layer signaling), CC #0, CC #1, and CC #2 are configured as an Scell, Pcell, and Scell, respectively. FIG. 21 illustrates the operation to perform power scaling by keeping (i.e., not changing) the transmission power of the SRS on CC #1, and dropping the PUSCH (without UCI) on CC #2 configured as an Scell, when the total value of transmission power of the PUSCH (without UCI) and the SRS channel transmitted on a plurality of CCs exceeds the UE-specific maximum transmission power in this situation.

It should be noted that, power scaling methods 14 and 15 may be selectively used in such a way that power scaling method 14 is used when a (periodic or aperiodic) SRS and a PUSCH on which UCI is multiplexed are simultaneously transmitted, and power scaling method 15 is used when a (periodic or aperiodic) SRS and a PUSCH on which no UCI is multiplexed are simultaneously transmitted. In other words, as illustrated in FIG. 20, power scaling method 14 is used when a PUSCH with UCI is transmitted using a Pcell and an SRS is transmitted using an Scell, while power scaling method 15 is used when an SRS is transmitted using a Pcell and a PUSCH without UCI is transmitted using an Scell. Thus, the measurement accuracy using an SRS can be increased as in the case of power scaling method 3 while high quality UCI transmission is maintained.

Although the description has been given of the case where power scaling occurs in simultaneous transmission of an SRS and a PUSCH, an SRS and a PUSCH may be transmitted on a plurality of CCs when no power scaling occurs.

In addition, the power scaling methods described above may be used in combination.

Embodiment 2

Embodiment 1 has been described with respect to the power scaling methods used when the total value of transmission power of a plurality of uplink channels transmitted on a plurality of CCs (cells) exceeds the UE-specific maximum transmission power in simultaneous transmission of the plurality of uplink channels (such as SRS, PUSCH and PUCCH). However, all the power scaling methods described in Embodiment 1 may be used when the total value of transmission power of a plurality of uplink channels transmitted on a plurality of CCs (cells) does not exceed the UE-specific maximum transmission power, but simultaneous transmission of a plurality of uplink channels (such as simultaneous transmission of SRSes, simultaneous transmission of an SRS and a PUSCH and simultaneous transmission of an SRS and a PUCCH) on a plurality of cells (e.g., a Pcell and a plurality of Scells) or a plurality of CCs (e.g., a PCC and a plurality of SCCs) occurs.

In Embodiment 2, a detailed description will be provided regarding the power scaling methods described in Embodiment 1 used when simultaneous transmission of a plurality of uplink channels (such as simultaneous transmission of SRSes, simultaneous transmission of an SRS and a PUSCH and simultaneous transmission of an SRS and a PUCCH) on a plurality of cells (e.g., a Pcell and a plurality of Scells) or a plurality of CCs (e.g., a PCC and a plurality of SCCs) occurs.

First, the background of Embodiment 2 will be briefly described.

Implementation of a plurality of power amplifiers (PAs) on a terminal using a single amplifier for each UL channel for the purpose of amplifying transmission signals on a plurality of UL channels from the terminal causes an increase in the cost of the terminal and also hinders miniaturization of the terminal (increases the size of the terminal). For this reason, a method in which a single PA covers a plurality of UL channels (CC, cell, carrier wave, frequency band, and/or the like), i.e., amplifies the transmission signals of the plurality of UL channels by the single PA is also used as an implementation method for terminals. In this case, a large peak-to-average power ratio (PAPR) of the simultaneous transmission (multi-carrier transmission) signals of a plurality of UL channels has a large influence on the PA having non-linearity as the input and output characteristics of the power (voltage). For example, the power efficiency of the PA is degraded. Otherwise, large non-linearity distortion occurs in the amplified signal. In particular, a terminal near a cell edge that needs large transmission power and has no margin for the transmission power (power head room (PHR) value is small) is significantly affected.

For this reason, in order to mitigate the influence from the transmission signals of a plurality of UL channels on a PA (in order to avoid any increase in PAPR of the transmission signals) in simultaneous transmission of a plurality of UL channels, a method is used, which reduces transmission power of a certain UL channel of the plurality of UL channels or sets a UL channel that is not transmitted. Specifically, power scaling is applied to a plurality of UL channels when simultaneous transmission of a plurality of uplink channels (such as simultaneous transmission of SRSes, simultaneous transmission of an SRS and a PUSCH and simultaneous transmission of an SRS and a PUCCH) on a plurality of cells (e.g., a Pcell and a plurality of Scells) or a plurality of CCs (e.g., a PCC and a plurality of SCCs) occurs.

Accordingly, problems similar to those described in Embodiment 1 occur when simultaneous transmission of a plurality of uplink channels occurs on a plurality of cells or CCs although the total value of transmission power of the plurality of uplink channels transmitted on the plurality of CCs (cells) does not exceed the UE-specific maximum transmission power. Stated differently, the technique disclosed in NPL 1 has the following problems. Specifically, the technique does not take into account the effects of the method of selecting a CC for multiplexing important UCI to which no retransmission is applied, on the power allocation priority used when power scaling is applied in simultaneous transmission of a plurality of periodic SRSes on a plurality of CCs. Since UCI needs to be reported to an eNB from a terminal with a small delay, only single transmission is supported for UCI.

Accordingly, when a CC configured with lower power allocation priority based on the technique disclosed in NPL 1 (CC that is likely to have a larger CQI measurement error (measurement accuracy is degraded) in the eNB) is used as a CC on which UCI is to be multiplexed, the measurement error of communication quality (e.g., Signal-to-Interference plus Noise power Ratio (SINR)) on the CC, which is derived using an SRS subjected to power scaling (transmission power is reduced), is large. Accordingly, the eNB cannot report an appropriate transmission power (or Modulation and channel Coding Scheme (MCS)) value for the UCI to be transmitted in a subsequent subframe.

For example, when a UE performs power scaling (reduction of transmission power) for an SRS on a certain CC of a smaller UL CC ID number based on the technique disclosed in NPL 1 in simultaneous transmission of a plurality of SRSes on a plurality of CCs, the eNB measures the communication quality of the CC using a received SRS with a reduced reception level.

However, the eNB may erroneously recognize the reason for reduction in the SRS reception level as being deterioration in the quality of the mobile communication channel, which easily changes with time, instead of the occurrence of power scaling in the terminal. In addition, when power scaling (reduction in transmission power) is performed on the SRS with transmission power that is correctly controlled by transmission power control for each UL channel so as to satisfy a predetermined requirement value necessary for reception quality measurement, the transmission power no longer satisfies the requirement.

Accordingly, the eNB instructs, by using a falsely recognized communication quality measurement value or a communication quality measurement value obtained from the received SRS that does not satisfy a predetermined requirement value, a terminal to use a larger transmission power value (small MCS value) not less than a value required to satisfy predetermined reception quality for transmission of a subsequent UL channel such as a PUSCH. Stated differently, transmission of a UL channel with excessive quality is performed for a subsequent UL channel such as a PUSCH in this case (co-channel interference to another cell is increased when an instruction to increase the transmission power is transmitted. In addition, another problem such as an unnecessary increase in the power consumption of the terminal is caused). In particular, when the eNB reports an inappropriate transmission power value (MCS value) for a PUSCH or PUCCH on which important UCI is multiplexed, by using the communication quality measurement value obtained from the received SRS that does not satisfy a predetermined requirement value, the system control is significantly affected since no retransmission is applied to UCI.

More specifically, the same problems as those described in Embodiment 1 occur. Accordingly, the invention of a power scaling method similar to that in Embodiment 1 has been made with careful observation of the abovementioned points in Embodiment 2 as well.

Hereinafter, a description will be provided regarding a configuration and processing of terminal 100 of Embodiment 2 with reference to FIG. 2. This description will focus on differences between Embodiment 1 and Embodiment 2.

The series of processes up to control information extraction section 106 is similar to the processes performed in Embodiment 1. Control information extraction section 106 extracts control information from the signal outputted from channel decoding section 105 and outputs the extracted control information to transmission power calculating section 107. The control information to be extracted herein includes: UL grant information (allocation bandwidth, MCS set, PUSCH, SRS or PUCCH transmission power information (TPC command, transmission format dependent value $\Delta_{TF}$ such as MCS, and SRS_offset value $P_{SRS\_offset}$), and aperiodic SRS trigger information, for example), DL grant information (transmission power information on PUCCH or the like, and aperiodic SRS trigger information, for example), UCI request (trigger) information, CC/cell information such as Pcell/Scell and PCC/SCC.

Transmission power calculating section 107 calculates transmission power of a plurality of UL channels (on each CC) using the control information outputted from control information extraction section 106, CC-specific (each UL channel) maximum transmission power (such as power class of power amplifier (PA) and MPR), path-loss (estimate) information, transmission power related reporting information on a higher layer (path-loss compensation coefficient, P_o (target reception level value) and/or the like), for example. As a specific calculation method, PUSCH, PUCCH and SRS transmission power calculation formulae described in NPL 3 are used, for example. Transmission power calculating section 107 outputs transmission power values of a plurality of UL channels (on each CC) to power scaling detecting section 108 and power scaling controlling section 109.

Power scaling detecting section 108 detects whether or not there is more than one UL channel transmission power value outputted from transmission power calculating section 107 (detects whether or not simultaneous transmission of a plurality of UL channels occurs). When there is not more than one UL channel transmission power value (one), power scaling detecting section 108 outputs control information indicating "power scaling is unnecessary" to power scaling controlling section 109. When there is more than one UL channel transmission power value, on the other hand, power scaling detecting section 108 outputs control information indicating "power scaling is necessary" to power scaling controlling section 109.

In accordance with information indicating the presence or absence of occurrence of power scaling outputted from power scaling detecting section 108, power scaling controlling section 109 performs transmission power scaling on each UL channel (such as SRS, PUSCH and PUCCH) when the control information indicates "power scaling is necessary," to determine the transmission power for each of the plurality of UL channels (CCs). The transmission power information obtained after power scaling is outputted to transmission power setting sections 112-1 to 112-N. The details of an SRS power scaling method will be described hereinafter.

The series of processes from coding and modulation sections 110-1 to 110-N to radio transmission processing section 115 is the same as that in Embodiment 1 (see, FIG. 2). Thus, the description of the processes is omitted herein. For the CC on which an SRS is transmitted, transmission power setting sections 112-1 to 112-N receive an SRS, and transmission power of the SRSes are set based on the information received from power scaling controlling section 109.

Power scaling methods 1-A to 12-A for SRSes in simultaneous transmission of a plurality of SRSes will be described.

Power Scaling Method 1-A

In power scaling method 1-A, transmission power calculating section 107 calculates transmission power of a plurality of UL channels on a plurality of CCs, first.

Next, power scaling detecting section 108 detects whether or not there is a plurality of transmission power values of UL channels transmitted on a plurality of CCs (detects whether or not simultaneous transmission of a plurality of UL channels occurs). More specifically, power scaling detecting section 108 detects whether or not power scaling occurs.

Next, when power scaling (simultaneous transmission of a plurality of UL channels) occurs in simultaneous transmission of a plurality of (periodic or aperiodic) SRSes using a Pcell (PCC) and Scell (SCC), power scaling controlling section 109 preferentially allocates transmission power with respect to an SRS of a Pcell over an SRS of an Scell of the plurality of (periodic or aperiodic) SRSes to be transmitted simultaneously.

FIG. 4 illustrates an overview of power scaling method 1-A. In FIG. 4, the SRSes are simultaneously transmitted on three CCs (CC #0 to CC #2). For example, the last symbol position of one subframe is used to transmit only the SRS on the three CCs (see, FIG. 3). According to the control signal reported from the base station (via higher layer signaling), CC #0, CC #1, and CC #2 are configured as an Scell, Pcell, and Scell, respectively. FIG. 4 illustrates the operation to preferentially allocate transmission power with respect to the SRS on CC #1 configured as a Pcell over the SRSes on CC #0 and CC #2 each configured as an Scell, when there is a plurality of transmission power values of SRS channels transmitted on the three CCs including a Pcell and an Scell (when simultaneous transmission of a plurality of SRS channels occurs) in this situation.

Accordingly, it is possible to reduce the probability of a CC that transmits an SRS with low power allocation priority (i.e., CC that is likely to have a larger CQI measurement error) being identical to a CC on which UCI is to be multiplexed. For example, the probability of the Scells of CC #0 and CC #2 with low power allocation priority being identical to a CC on which UCI is to be multiplexed can be reduced as illustrated in FIG. 4.

Thus, the propagation channel quality information (Channel Quality Indicator (CQI)) on the Pcell on which UCI is likely to be multiplexed can be estimated with high accuracy by the SRS with high power allocation priority. Accordingly, the eNB can indicate appropriate transmission power (MCS) for a subsequent UL channel transmitting UCI (e.g., PUSCH on which data and UCI are multiplexed, PUCCH on which UCI is multiplexed, and/or the like). Stated differently, it is possible to transmit UCI without setting excessive quality for the transmission format used for the UL channel transmitting the UCI. In addition, transmission can be performed without any unnecessary increase of the co-channel interference to another cell or in power consumption of the terminal. In other words, the eNB can report, by using a communication quality measurement value obtained from a received SRS of Pcell, which satisfies a predetermined requirement value, an appropriate transmission power value (MCS value) for a PUSCH or PUCCH on which important UCI is multiplexed, and thus allows UCI to which no retransmission is applied to be correctly transmitted.

Power Scaling Method 2-A

In power scaling method 2-A, power scaling controlling section 109 performs power scaling by setting the transmission power of the SRS of a Pcell to be not greater than the CC-specific (for each UL channel) maximum transmission power (while satisfying the CC-specific maximum transmission power condition), then keeping (not changing) the transmission power of the SRS of the Pcell, and reducing the transmission power of an Scell.

FIG. 5 illustrates an overview of power scaling method 2-A. In FIG. 5, the SRSes are simultaneously transmitted on three CCs (CC #0 to CC #2). According to the control signal reported from the base station (via higher layer signaling), CC #0, CC #1, and CC #2 are configured as an Scell, Pcell, and Scell, respectively. FIG. 5 illustrates the operation to perform power scaling by keeping (i.e., not changing) the transmission power of the SRS on CC #1 configured as Pcell and reducing the transmission power of the SRSes on CC #0 and CC #2 each configured as an Scell, when there is a plurality of transmission power values of SRS channels transmitted on the three CCs including a Pcell and an Scell (when simultaneous transmission of a plurality of SRS channels occurs) in this situation.

Accordingly, setting the transmission power of the SRS of a Pcell configured for each terminal, in such a way that the condition that the transmission power of the SRS of a Pcell is equal to or less than the maximum transmission power of each CC (each UL channel) makes it possible to maintain co-channel interference to another cell from a CC configured as a Pcell used preferentially, to be equal to or less than a certain predetermined value and also makes scheduling for each CC and cross-carrier scheduling performed by each eNB easier. In addition, surely keeping (not allowing any change) the transmission power level of the SRS of a Pcell allows the propagation channel quality of the Pcell by a (periodic or aperiodic) SRS to be measured with even higher accuracy than that in the case of power scaling method 1-A.

In other words, it is possible to prevent the communication quality information on a Pcell that is obtained from the received SRS of the Pcell from being affected by power scaling in the terminal (to avoid misrecognition of the UE transmission power between the UE and eNB, or enables use of a communication quality measurement value obtained from the received SRS that satisfies a predetermined requirement value). Thus, the eNB can perform more appropriate operation in subsequent scheduling (resource allocation) and transmission power (Adaptive Modulation channel Coding (AMC)) control on the Pcell on which UCI is likely to be transmitted. Accordingly, it is possible to obtain the effect of eliminating the need for passive control such as setting a large margin for transmission power (AMC) control.

Power Scaling Method 3-A

In power scaling method 3-A, power scaling controlling section 109 performs power scaling by keeping (not changing) the transmission power of the SRS of a Pcell, and dropping the SRS of an Scell (this means that no SRS is transmitted or transmission power is set equal to zero (transmission power=0)).

FIG. 6 illustrates an overview of power scaling method 3-A. As in FIGS. 4 and 5, the SRSes are simultaneously transmitted on three CCs (CC #0 to CC #2) in FIG. 6. According to the control signal reported from the base station (via higher layer signaling), CC #0, CC #1, and CC #2 are configured as an Scell, Pcell, and Scell, respectively. FIG. 6 illustrates the operation to perform power scaling by keeping (i.e., not changing) the transmission power of the SRS on CC #1 configured as a Pcell, and dropping the SRS on CC #2 configured as an Scell, when there is a plurality of transmission power values of SRS channels transmitted on the three CCs including a Pcell and an Scell (when simultaneous transmission of a plurality of SRS channels occurs) in this situation.

Accordingly, dropping the SRS of an Scell enables simplification of complex power allocation control between CCs in addition to obtaining the effects brought about by power scaling method 1-A. In LTE-A, an SRS is multiplexed only at the last symbol of one subframe consisting of 14 symbols. Accordingly, even when the last symbol alone is dropped, the influence on the spectrum efficiency is small. For example, when an SRS is transmitted only on one CC, the impact of dropping the symbol is equal to 7% ($1/14=7\%$). Moreover, the frequency (cycle) of SRS transmission is, for example, once in 10 ms for periodic SRS, which is very low as compared with the frequency of data transmission. Thus, the influence on the spectrum efficiency is even smaller (data can be transmitted once in 1 ms at minimum).

In addition, dropping an SRS enables a reduction in the possibility that the eNB erroneously recognizes that the quality of the propagation channel has been deteriorated and also avoiding unnecessary transmission of the SRS which no longer satisfies a predetermined requirement value for reception quality measurement (to which scaling has been applied). In other words, unnecessary power consumption of terminals can be reduced.

In Embodiment 2, all the SRSes of a plurality of Scells may be dropped uniformly. FIG. 7 illustrates a case where two SRSes respectively on CC #0 and CC #2 are dropped in simultaneous transmission of SRSes on CC #0 to CC #2. Thus, it is possible to omit the arithmetic operation required for power allocation processing between CCs while obtaining the same effects as those described above, and also to significantly reduce the man hours for testing terminals (or eNBs) with respect to power scaling, which is indispensable for the commercialization of LTE-A. In addition, unnecessary power consumption of terminals can be further reduced.

In addition, when a periodic SRS and aperiodic SRS are transmitted using Scells, a periodic SRS may be preferentially dropped over an aperiodic SRS.

An aperiodic SRS is the SRS that is newly introduced into LTE-A and configured to be triggered by a PDCCH, which is a physical layer downlink control channel, for an eNB to measure new quality information with low delay. Meanwhile, a periodic SRS (of transmission cycle, trigger, timer and/or the like) is configured by higher layer signaling, so that only low speed control is possible. Accordingly, the feature of an aperiodic SRS (for eNB to make immediate determination on CQI measurement using SRS) can be reflected in power scaling processing, and the same effects as those described above can be obtained.

FIG. 8 illustrates how the periodic SRS of the Scell of CC #2 is dropped when the aperiodic SRS is triggered on the Scell of CC #0 and the periodic SRS is triggered on the Scell of CC #2 while nothing is transmitted using the Pcell of CC #1 at the same symbol position of the same subframe (e.g., the last symbol position of a subframe).

Power Scaling Method 4-A

In power scaling method 4-A, when a plurality of SRSes of Scells is present, power scaling controlling section 109 reduces (drops or sets the transmission power to be equal to zero (no SRS transmission)) the transmission power in ascending order of the transmission power of SRSes of the Scells (or the smallest) (while keeping the transmission power of the SRS of the Pcell).

FIG. 9 illustrates an overview of power scaling method 4-A. As in FIGS. 4 and 5, the SRSes are simultaneously transmitted on the three CCs (CC #0 to CC #2) in FIG. 9. According to the control signal reported from the base station (via higher layer signaling), CC #0, CC #1, and CC #2 are configured as an Scell, Pcell, and Scell, respectively. In addition, the transmission power of the SRS of the Scell before power scaling is larger for the SRS on CC #2 than for the SRS on CC #0. FIG. 9 illustrates the operation to perform power scaling by preferentially dropping the SRS transmission on CC #0 configured as the Scell with smaller transmission power (or the smallest) when there is a plurality of transmission power values of SRS channels transmitted on the three CCs including a Pcell and an Scell (when simultaneous transmission of a plurality of SRS channels occurs) in this situation.

Accordingly, since an SRS with smaller transmission power is more likely to fall below an SRS detection level capable of being received by an eNB (e.g., noise level at eNB), preferentially reducing the transmission power of the SRS of an Scell with smaller transmission power makes it possible to maintain the accuracy in measurement using the SRS of the Scell from which no transmission power is reduced, while maintaining highly accurate quality measurement on a Pcell.

Power Scaling Method 5-A

In power scaling method 5-A, when a plurality of SRSes of Scells is present, power scaling controlling section 109 uniformly reduces the transmission power of the plurality of SRSes of the Scells (reduces the same transmission power value or applies the same scaling (weighting)) (while keeping (not changing) the transmission power of the SRS of a Pcell).

FIG. 10 illustrates an overview of power scaling method 5-A. As in the case described above, the SRSes are simultaneously transmitted on the three CCs (CC #0 to CC #2) in FIG. 10. According to the control signal reported from the base station (via higher layer signaling), CC #0, CC #1, and CC #2 are configured as an Scell, Pcell, and Scell, respectively. FIG. 10 illustrates how the transmission power of CC #0 and CC #2 configured as the Scells is uniformly reduced when there is a plurality of transmission power values of SRS channels transmitted on the three CCs including a Pcell and an Scell (when simultaneous transmission of a plurality of SRS channels occurs) in this situation. Examples of the method used to uniformly reduce the transmission power include a method to reduce transmission power with the same value (true value or decibel value) or to apply the same scaling (weight) (applied in LTE-A). Meanwhile, as the scaling weight used for reducing the transmission power of SRSes, a scaling weight for SRSes may be used, or the same scaling weight as that for another UL channel (e.g., PUSCH, PUSCH with UCI or PUSCH without UCI) may be used for SRSes. The term "scaling weight" used herein refers to a parameter that is previously reported to a terminal from an eNB.

Accordingly, it is possible to enable simplification of complex power allocation control between CCs while maintaining highly accurate quality measurement on a Pcell.

Power Scaling Method 6-A

In power scaling method 6-A, when a plurality of SRSes of Scells is present, power scaling controlling section 109 drops all the SRSes of the Scells (uniformly drops SRSes of Scells) (stops the transmission or sets the transmission power to be equal to zero).

FIG. 11 illustrates an overview of power scaling method 6-A. As in the case described above, the SRSes are simultaneously transmitted on the three CCs (CC #0 to CC #2) in FIG. 11. According to the control signal reported from the base station (via higher layer signaling), CC #0, CC #1, and CC #2 are configured as an Scell, Pcell, and Scell, respectively. FIG. 11 illustrates how the SRSes on CC #0 and CC #2 configured as the Scells are uniformly dropped when there is a plurality of transmission power values of SRS channels transmitted on the three CCs including a Pcell and an Scell (when simultaneous transmission of a plurality of SRS channels occurs) in this situation.

Accordingly, it is possible to enable simplification of complex power allocation control between CCs while obtaining the effects similar to those obtained with power scaling method 3-A. In addition, the man hours for testing terminals (or eNBs) with respect to power scaling, which is indispensable for the commercialization of LTE can be significantly reduced. For example, although it is required to determine the specifications for testing all combinations of SRSes on a plurality of Scells to be transmitted, the man hours for the testing itself or for determining the specifications for the testing can be reduced. Furthermore, unnecessary power consumption of terminals can be reduced.

It should be noted that, when a plurality of SRSes is present in Scells, instead of uniformly dropping all the SRSes, it is possible to drop the SRSes in (ascending/descending) order of the CC (cell) numbers.

Power Scaling Method 7-A

In power scaling method 7-A, when transmission power of a certain SRS of a plurality of SRSes is smaller than the SRS having the largest transmission power among the SRSes by at least the amount of a predetermined threshold, power scaling controlling section 109 reduces the transmission power of the certain SRS of the Scell or drops the certain SRS (stops the transmission or sets the transmission power to be equal to zero).

FIG. 12 illustrates an overview of power scaling method 7-A. As in the cases described above, the SRSes are simultaneously transmitted on the three CCs (CC #0 to CC #2) in FIG. 12. According to the control signal reported from the base station (via higher layer signaling), CC #0, CC #1, and CC #2 are configured as an Scell, Pcell, and Scell, respectively. FIG. 12 illustrates how the SRS of the Scell is dropped when there is a plurality of transmission power values of SRS channels transmitted on the three CCs (when simultaneous transmission of a plurality of SRS channels occurs) and also when a difference between the transmission power of the SRS having the largest transmission power among the plurality of SRSes and the SRS of the Scell is at least a predetermined threshold in this situation described above. FIG. 12 illustrates a case where the difference between the transmission power of the SRS of the Scell of CC #2 and the transmission power of the SRS of the Pcell of CC #1, which is the largest among the plurality of SRSes, is at least a predetermined value.

When a difference in the transmission power of SRS between CCs is large, there occurs a situation where the intermodulation distortion of the SRS on the CC with larger transmission power becomes larger than the transmission power of the SRS on a different CC. The intermodulation distortion cannot be removed by a transmission filter. In other words, when the SRS is transmitted without removal of the intermodulation distortion, the eNB measures the communication quality of the CC by the SRS affected by the intermodulation distortion. As a result, correct scheduling or transmission power control cannot be performed. Accordingly, this problem can be avoided by dropping the SRS of the Scell when the difference between the largest SRS transmission power and the SRS transmission power of the Scell is at least a predetermined threshold.

As a method of setting the threshold, it is possible to set a certain value and to adaptively change the value according to a path-loss (measurement) value.

In addition, instead of the transmission power of an SRS having the largest transmission power among a plurality of SRSes, the transmission power of a channel having the largest transmission power among UL channels to be simultaneously transmitted may be set as the reference value. Accordingly, the same effects can be obtained with this configuration.

Power Scaling Method 8-A

In power scaling method 8-A, when transmission power of a certain SRS of an Scell is not greater than a predetermined threshold, power scaling controlling section 109 reduces the transmission power of the SRS of the Scell or drops the SRS (stops the transmission or sets the transmission power to be equal to zero).

FIG. 13 illustrates an overview of power scaling method 8-A. As in the cases described above, the SRSes are simultaneously transmitted on the three CCs (CC #0 to CC #2) in FIG. 13. According to the control signal reported from the base station (via higher layer signaling), CC #0, CC #1, and CC #2 are configured as an Scell, Pcell, and Scell, respectively. FIG. 13 illustrates how the SRS of the Scell is dropped when there is a plurality of transmission power values of SRS channels transmitted on the three CCs (when simultaneous transmission of a plurality of SRS channels occurs) and also when the transmission power of the Scell of the plurality of SRSes is not greater than a certain threshold in this situation described above.

When the transmission power of an SRS on a CC is too small, the transmission signal cannot be correctly expressed with the resolution of the digital/analog (D/A) converter of the terminal (transmission side). However, the introduction of a threshold and dropping an SRS having transmission power not greater than the threshold make it possible to avoid unnecessary transmission processing (i.e., complex designing of D/A taking into account (covering) low transmission power values) (consuming unnecessary transmission power can be avoided).

Power Scaling Method 9-A

In power scaling method 9-A, power scaling controlling section 109 selects an SRS on a CC to be dropped (e.g., power allocation priority is lowered, transmission power is reduced, transmission is stopped, or transmission power is set equal to zero), in accordance with the length of the transmission cycle of a periodic SRS. Specifically, power scaling controlling section 109 selects a periodic SRS of a long transmission cycle as the SRS on a CC to be preferentially dropped or a periodic SRS of a short transmission cycle as the SRS on a CC to be preferentially dropped.

When an SRS of a long transmission cycle is selected as the SRS on a CC to be preferentially dropped, it is possible to obtain the same effects as those obtained with power scaling method 3-A and also to preferentially follow short-term channel variation and achieves adaptive modulation and channel coding (AMC) in accordance with short-term fading variation and also to control time-frequency domain scheduling with high accuracy. Thus, UE-specific throughput and system throughput by multi-user diversity can be improved.

When an SRS of a short transmission cycle is selected as the SRS on a CC to be preferentially dropped, it is possible to obtain the same effects as those obtained with power scaling method 3-A and also to improve the long-term channel measurement accuracy. Thus, cross-carrier scheduling control, which adaptively selects a CC used for transmitting data and control information, can be performed with high accuracy.

Power Scaling Method 10-A

In power scaling method 10-A, power scaling controlling section 109 selects an SRS on a CC to be dropped (e.g., power allocation priority is lowered, transmission power is reduced, transmission is stopped, or transmission power is set equal to zero), in accordance with the bandwidth of each SRS. Specifically, an SRS having a wide bandwidth is preferentially dropped over an SRS having a narrow bandwidth, or an SRS having a narrow bandwidth is preferentially dropped over an SRS having a wide bandwidth.

When an SRS having a wide bandwidth is preferentially dropped over an SRS having a narrow bandwidth, the following effects can be obtained. The transmission power of a UL channel (such as PUSCH and SRS) of LTE-A (LTE) is determined based on the transmission bandwidth and power spectrum density (PSD). Thus, reducing the transmission power allocation priority of an SRS having a wide bandwidth that has a large influence on the size of the total transmission power makes it possible to minimize the number of SRSes to be dropped. For example, provided that the total bandwidth of SRSes on a plurality of CCs is defined as B, comparing the case where the bandwidth of the SRS on one CC is B with the case where the bandwidth of each of the SRSes on two CCs is B/2, the number of CCs to be dropped can be smaller when the SRS on one CC is preferentially dropped. Such a decrease in the number of CCs to be dropped is very advantageous when sounding on as many CCs as possible using SRSes is performed to select a CC for transmitting data, control information and/or the like. In addition, since a wider bandwidth involves larger intermodulation distortion, reducing the power allocation priority for an SRS having a wide bandwidth can reduce the influence of out-of-band leakage (intermodulation distortion) over a wide range on a different CC.

It is also possible to introduce a threshold into the bandwidth determination and to preferentially drop a corresponding SRS when a bandwidth between SRSes or a difference between bandwidths of SRSes exceeds the threshold.

In addition, the larger the ratio of an SRS bandwidth to a CC bandwidth (e.g., SRS bandwidth/CC bandwidth) is, the more the power allocation priority for the corresponding SRS on the CC may be lowered.

Meanwhile, when an SRS having a narrow bandwidth is preferentially dropped over an SRS having a wide bandwidth, the following effects can be obtained. When a high quality frequency resource is assigned by measuring a propagation channel over a wide bandwidth of only one CC, a wide range frequency band can be measured at once.

It is also possible to introduce a threshold into the bandwidth determination and to drop a corresponding SRS when a bandwidth between SRSes or a difference between the bandwidths of the SRSes exceeds the threshold.

In addition, the smaller the ratio of an SRS bandwidth to a CC bandwidth (e.g., SRS bandwidth/CC bandwidth) is, the more the power allocation priority for the corresponding SRS on the CC may be lowered.

Power Scaling Method 11-A

In power scaling method 11-A, when a plurality of SRSes of Scells is present, power scaling controlling section 109 raises the power allocation priority for the SRS on a CC on which UCI (such as CQI or PMI) reporting is triggered (to be triggered) by control information included in a physical layer control channel PDCCH (UL or DL grant) or control information reported (to be reported) via higher layer signaling, of the plurality of SRSes of the Scells. For example, power scaling controlling section 109 raises the power allocation priority for the SRS on the CC on which UCI reporting such as aperiodic CSI is triggered. Furthermore, on the basis of the priority for an Scell used for reporting periodic CQI (PMI) indicated via higher layer signaling such as radio resource control (RRC) from the eNB, power scaling controlling section 109 raises the power allocation priority for the SRS on the CC configured as an Scell with higher priority, for example.

Specifically, power scaling controlling section 109 raises the power allocation priority for the SRS on the CC configured as an Scell with higher priority indicated by the eNB among a Cell (CC) indicated by the eNB to transmit UCI with a PUSCH (to multiplex UCI on PUSCH) and a Cell (CC) on which UCI is transmitted with a PUSCH (UCI is multiplexed on PUSCH).

On the other hand, when a plurality of SRSes of Scells is present, power scaling controlling section 109 lowers (preferentially drops, reduces the transmission power, stops transmission, or sets the transmission power to be equal to zero) power allocation priority for the SRS on a CC on which no UCI (such as CQI or PMI) is triggered (has been triggered) by control information included in a physical layer control channel PDCC (UL or DL grant) or control information reported (to be reported) via higher layer signaling, of the plurality of SRSes. For example, power scaling controlling section 109 lowers the power allocation priority for the SRS on a CC on which UCI reporting such as aperiodic CSI is not triggered (has not been triggered) by any UL grant. Furthermore, on the basis of the priority for an Scell used for reporting periodic CQI (PMI) indicated via higher layer signaling such as radio resource control (RRC) from the eNB, power scaling controlling section 109 lowers the power allocation priority for the SRS on the CC configured as an Scell with lower priority, for example.

Specifically, power scaling controlling section 109 lowers the power allocation priority for the SRS of a Cell (CC) with lower priority among a Cell (CC) indicated by the eNB not to transmit UCI with a PUSCH (to multiplex UCI on PUSCH) and a Cell (CC) on which UCI is transmitted with a PUSCH (UCI is multiplexed on PUSCH).

The operation described above is used because an (e.g., aperiodic) SRS is likely to be transmitted on a CC which has been indicated by higher layer signaling such as RRC from the eNB and which has higher priority as an Scell used in reporting periodic CQI (PMI). This is because quality measurement of such a Cell (CC) needs to be accurately performed before UCI transmission. In addition, if the power allocation priority for the (aperiodic) SRS to be transmitted on the CC is lowered (or dropped), MCS selection or transmission power control for UCI to be transmitted on a subsequent subframe is not correctly performed.

FIG. 14 illustrates an overview of power scaling method 11-A. As in the cases described above, the SRSes are simultaneously transmitted on the two CCs (CC #0 and CC #2) in FIG. 14. According to the control signal reported from the base station (via higher layer signaling), CC #0, CC #1, and CC #2 are configured as an Scell, Pcell, and Scell, respectively. When there is a plurality of transmission power values of SRS channels transmitted on a plurality of CCs (when simultaneous transmission of a plurality of SRS channels occurs) in this situation, the power allocation priority for the SRS on a CC on which UCI such as aperiodic CSI is triggered (to be triggered) by a UL grant is raised, of the two SRSes of the two Scells. FIG. 14 illustrates a situation where UCI has been triggered on the Scell of CC #2 in a previous subframe while no UCI has been triggered on CC #0.

Accordingly, the same effects as those obtained with power scaling method 1-A can be obtained among a plurality of Scells (SCCs).

The priority for the Scell on which UCI has been triggered may be kept for a certain period. Moreover, the priority for the Scell may be kept until UCI is triggered on a different CC. In addition, when there is a plurality of Scells on which UCI has been triggered, SRS power scaling may be performed according to the latest trigger information. When there is a plurality of Scells on which UCI has been triggered and also the UCI has been triggered at the same time, power scaling priority may be determined in accordance with UL CC ID numbers (in ascending or descending order).

The priority order information for a CC on which UCI is transmitted and which is reported (indicated) by higher layer signaling among the plurality of Scells may be kept for a certain period (power scaling may be performed in accordance with the information for a certain predetermined period). Moreover, the priority order may be kept until a new priority order is reported (indicated) from the eNB via higher layer signaling. When the new priority order is reported (indicated), power scaling may be performed according to the new priority order.

In addition, as described above, the power allocation priority for SRSes on CCs may be set based on the priority order of Scells which are indicated by higher layer signaling such as radio resource control (RRC) from the eNB and which are used for reporting periodic CQI (PMI). For example, the power allocation priority for the SRS is raised on a Cell having higher priority and indicated by the eNB among a Cell (CC) indicated by the eNB to transmit UCI with a PUSCH among a plurality of Scells and a Cell (CC) on which UCI is transmitted with a PUSCH among a plurality of Scells. On the other hand, the power allocation priority for the SRS is lowered on a Cell (CC) having lower priority and indicated by the eNB among a Cell (CC) indicated by the eNB not to transmit UCI with a PUSCH among a plurality of Scells and a Cell (CC) on which UCI is transmitted with a PUSCH among a plurality of Scells.

Accordingly, the same effects as those described above can be obtained with this configuration.

Moreover, it is also possible to keep (not to change) the transmission power (PSD) of an SRS of the Scell having the top priority based on the priority order of Scells indicated by higher layer signaling such as RRC from the eNB and used for reporting periodic CQI (PMI).

Accordingly, it is possible to increase the accuracy in the quality measurement of the Scell on which UCI is likely to be transmitted, while obtaining the same effects as those described above. The eNB can report appropriate transmission power (MCS) used in transmission of UCI to the terminal.

Moreover, it is also possible to select an Scell with lower priority as the SRS to be dropped, based on the priority order of Scells indicated by higher layer signaling such as RRC from the eNB and used for reporting periodic CQI (PMI). For example, it is possible to keep (not to change) the transmission power (PSD) of the SRS of the Scell with the top priority and to drop (to set the transmission power to be equal to zero, set the PSD to be equal to zero, or reduce the transmission power) all the transmission power of SRSes of the other Scells.

Accordingly, the same effects as those obtained by power scaling method 3-A can be obtained among a plurality of Scells. More specifically, when a plurality of SRSes is all simultaneously transmitted using a Pcell and a plurality of Scells, the same effects as those described above can be obtained. It is also possible to drop (to set the transmission power to be equal to zero, stop the transmission or set the PSD to be equal to zero) the SRSes of Scells in ascending order of priority of Scells (CCs). Accordingly, the same effects as those described above can be obtained with this configuration.

In the abovementioned method, the eNB (not illustrated) determines the priority order for each terminal for an Scell used in reporting periodic CQI (PMI) or the like among a plurality of Scells or selects a Cell (CC) for each terminal for transmitting UCI with a PUSCH (UCI is multiplexed on PUSCH) among a plurality of Scells, using Scell or Pcell information set for each terminal and/or an uplink interfered state for each CC (Cell), for example. The determined or selected information such as priority order is reported to the terminal using higher layer signaling (RCC). The terminal that has received the information uses the information for power scaling when simultaneous transmission on a plurality of UL channels occurs.

Power Scaling Method 12-A

In power scaling method 12-A, power scaling controlling section 109 preferentially drops an SRS having a low PSD over an SRS having a high PSD (lowers the power allocation priority, reduces the transmission power, stops the transmission, or sets the transmission power to be equal to zero).

When a difference in PSD of SRS between CCs is large, the intermodulation distortion of the SRS on the CC having a higher PSD may become larger than a PSD of an SRS on a different CC. This intermodulation distortion cannot be removed by a transmission filter. Specifically, when the SRS is transmitted without removal of the intermodulation distortion, the eNB measures the communication quality of the CC by the SRS affected by the intermodulation distortion. As a result, correct scheduling or transmission power control cannot be performed. With respect to this problem, transmission of only an SRS having a high PSD, which is unlikely to be affected by the intermodulation distortion, allows an eNB to perform measurement on the CC with high accuracy.

FIG. 15 illustrates an overview of power scaling method 12-A. In FIG. 15, as in the cases described above, the SRSes are simultaneously transmitted on the two CCs (CC #0 and CC #1) in FIG. 15. According to the control signal reported from the base station (via higher layer signaling), CC #0 and CC #1 are each configured as an Scell. In FIG. 15, the dotted line indicates harmonic distortion (intermodulation distortion). Under this condition, an SRS having a low PSD that is likely to be affected by intermodulation distortion is dropped.

It should be noted that, a transmission power control parameter (PUSCH or SRS) related to calculating a PSD value may be used to determine the SRS to be dropped. Examples of the parameter includes a TPC command accumulation value, transport block size, offset parameter related to an MCS level (TF), SRS offset value with respect to PUSCH transmission power, and the number of bits per RE (TB size/the number of allocated REs). When these values are high, the corresponding SRS has a higher PSD. Thus, the SRS to be dropped may be determined based on these values. In addition, when the number of allocated resource elements (REs) or the number of allocated subcarriers is small, the corresponding SRS has a higher PSD. Thus, the SRS to be dropped may be determined based on these values.

In addition, it is also possible to introduce a threshold for PSDs or the abovementioned parameters and to preferentially drop the corresponding SRS when these values exceed the threshold.

As described above, according to Embodiment 2, when a plurality of SRSes is simultaneously transmitted using a Pcell and Scell, transmission power is preferentially allocated with respect to the SRS of a Pcell over the SRS of an Scell. Thus, it is possible to reduce the probability of a CC that transmits an SRS with low power allocation priority being identical to a CC on which UCI is multiplexed. Accordingly, the propagation channel quality information on a Pcell on which UCI is likely to be multiplexed can be estimated with high accuracy using an SRS with high power allocation priority, which in turn allows the eNB to indicate appropriate transmission power for a subsequent UL channel on which UCI is to be transmitted.

It should be noted that, although the description has been given regarding the situation between CCs, the methods described above may be applied to a plurality of SRSes on a CC.

In addition, the power scaling methods described above may be used in combination.

Moreover, the methods that have been described with an assumption that they are applied to a plurality of SRSes on a plurality of Scells may be applied in the same manner when a plurality of SRSes on a Pcell or a plurality of SRSes on a plurality of Pcells is present.

Furthermore, as a method of reducing the transmission power of an SRS with low power allocation priority described above, an SRS scaling weight reported from an eNB to a terminal (via higher layer signaling) may be used to reduce the transmission power. When w_Pcell_SRS and w_Scell_SRS are defined as the scaling weights applied to SRSes of a Pcell and Scell, respectively, the scaling weights may be set (defined) to satisfy w_Pcell_SRS>w_Scell_SRS. Alternatively, the scaling weights may be defined to satisfy w_Pcell_SRS=1, and w_Scell_SRS<1. For dropping (stopping the transmission or setting the transmission power to be equal to zero), it is possible to set w_Scell_SRS=0.

In addition, the power scaling methods described above may be used in combination. Combining the power scaling methods according to Embodiments 1 and 2 enables performing power scaling when the total value of transmission power of a plurality of uplink channels transmitted on a plurality of CCs (Cells) does not exceed the UE-specific maximum transmission power, and also when simultaneous transmission of a plurality of uplink channels on a plurality of CCs occurs. An exemplary combined method (power scaling method 16-A) in which power scaling methods 3(3-A) and 12(12-A) according to Embodiment 1(2) are combined will be described hereinafter.

Power Scaling Method 16-A

In power scaling method 16-A, when a plurality of SRSes is present on a plurality of Scells, power scaling controlling section 109 determines power allocation priority for an SRS based on a transport block (TB) size of a PUSCH included in a UL grant reported to a terminal from the eNB.

When the size of UCI is large (the number of bits is large), there arises a problem in that UCI of CQI or PMI cannot be multiplexed on a PUSCH with a small TB size. When CQI or PMI information on a plurality of CCs is reported to the eNB using a PUSCH of a single Scell, this problem becomes more significant. The method of reporting the information through division of UCI into a plurality of PUSCHs is not favorable in considering the influence on the PA as described above, for example, since such division results in UL multi-carrier transmission. Accordingly, it is favorable to employ a method to multiplex UCI on a PUSCH having a larger TB size, when a plurality of PUSCHs is assigned to a plurality of Scells.

Accordingly, in power scaling method 16-A, the priority for the transmission power of the SRS on a CC (Cell)

transmitting a PUSCH to which a large size TB is mapped is raised among a plurality of Scells, for example. Meanwhile, the priority for the transmission power of the SRS on a CC (Cell) transmitting a PUSCH on which a small size TB is mapped is lowered.

In the method described above, the priority for the transmission power of the SRS on a CC (Cell) on which a PUSCH of a large size TB is transmitted may be raised, while the priority for the transmission power of the SRSes of the other Scells (CCs) is lowered.

It is also possible to keep (not to change) the transmission power of the SRS on a CC (Cell) on which a PUSCH of a large size TB is transmitted, while reducing the transmission power of the SRSes of the other Scells (CCs).

It is also possible to keep (not to change) the transmission power of the SRS on a CC (Cell) on which a PUSCH of a large size TB is transmitted, while dropping (setting the transmission power to be equal to zero, stopping the transmission, or setting the PSD to be equal to zero) the SRSes of the other Scells (CCs).

It is also possible to drop (to set the transmission power to be equal to zero, stop the transmission, or set the PSD to be equal to zero) the SRSes in ascending order of the TB sizes of the PUSCHs respectively transmitted using the Scells (CCs).

Accordingly, the same effects as those obtained by the methods in the embodiments described above can be obtained.

The power allocation priority for the SRSes that is set according to power scaling method 16-A may be kept for a certain predetermined period. In addition, the priority may be kept among a plurality of Scells until combinations of a plurality of TB sizes different among a plurality of Scells are transmitted again. Moreover, SRS power scaling may be performed according to the latest priority with respect to the power allocation priority for the SRSes that is set according to power scaling method 16-A.

The above-noted embodiments have been described by examples of hardware implementations, but the present invention can be also implemented by software in conjunction with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

Each of the embodiments has been described with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an antenna array formed of a plurality of antennas, and/or the like.

For example, 3GPP LTE does not specify the number of physical antennas forming an antenna port, but specifies an antenna port as a minimum unit allowing each base station to transmit a different reference signal.

In addition, an antenna port may be specified as a minimum unit for multiplication of precoding vector weighting.

The disclosures of the specifications, the drawings, and the abstracts of Japanese Patent Application No. 2010-249005, filed on Nov. 5, 2010, and Japanese Patent Application No. 2010-258360, filed on Nov. 18, 2010, are incorporated herein by reference in their entirety.

INDUSTRIAL APPLICABILITY

The radio communication apparatus and power allocation method according to the present invention can be applied to mobile communication systems such as LTE-A.

REFERENCE SIGNS LIST

101 Antenna
102 Radio reception processing section
103 OFDM demodulating section
104 Demodulating section
105 Channel decoding section
106 Control information extracting section
107 Transmission power calculating section
108 Power scaling detecting section
109 Power scaling controlling section
110-1 to 110-N Coding and modulation section
111-1 to 111-N Multiplexing section
112-1 to 112-N Transmission power setting section
113-1 to 113-N SC-FDMA modulation section
114 Combining section
115 Radio transmission processing section

The invention claimed is:

1. An integrated circuit for controlling a mobile station, the integrated circuit comprising:
   transmission circuitry, which, in operation, controls transmission of uplink channels of a first cell group and a second cell group, wherein a cell group includes one or more cells; and
   power control circuitry, which is coupled to the transmission circuitry and which, in operation, controls a transmission power of the uplink channels of the second cell group, wherein, in case of simultaneous transmission of:
      the uplink channel(s) of the first cell group on which uplink control information is multiplexed; and
      a plurality of reference signals on the uplink channels of the second cell group,
   the power control circuitry uniformly reduces the transmission power of the uplink channels of the second cell group based on a transmission power of the uplink channel(s) of the first cell group.

2. The integrated circuit of claim 1, wherein the power circuitry uniformly reduces the transmission power of the uplink channels of the second cell group, in response to determining that a total of the transmission power of the uplink channel(s) of the first cell group and the transmission power of the uplink channels of the second cell group would exceed a transmission power threshold.

3. The integrated circuit of claim 2, wherein the transmission power threshold is specific to the mobile station.

4. The integrated circuit of claim 1, wherein the transmission circuitry, in operation, controls transmission of a reference signal on the uplink channel(s) of the first cell group on which the uplink control information is multiplexed.

5. The integrated circuit of claim 1, wherein the power circuitry uniformly reduces the transmission power of the uplink channels of the second cell group by setting the transmission power of the uplink channels of the second cell group to an equal value.

6. The integrated circuit of claim 1, wherein the transmission power of the uplink channel(s) of the first cell group is not reduced.

7. The integrated circuit of claim 1, wherein the plurality of reference signals include at least one of a periodic reference signal and an aperiodic reference signal.

8. The integrated circuit of claim 1, wherein the uplink channel(s) of the first cell group includes at least one of a physical uplink control channel (PUCCH) and a physical uplink shared channel (PUSCH).

9. The integrated circuit of claim 1, wherein the uplink control information is at least one of an acknowledgement/non acknowledgement (ACK/NACK), an aperiodic channel state information (CSI), and a periodic CSI.

10. The integrated circuit of claim 1, wherein the one or more cells included in the first cell group and the one or more cells included in the second cell group are configured by higher layer signaling.

* * * * *